United States Patent
Kim et al.

(10) Patent No.: US 12,269,467 B2
(45) Date of Patent: Apr. 8, 2025

(54) METHOD AND DEVICE FOR SHARING ADJACENT VEHICLE STATE INFORMATION

(71) Applicant: LG ELECTRONICS INC., Seoul (KR)

(72) Inventors: Myoungseob Kim, Seoul (KR); Hanbyul Seo, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 17/632,998

(22) PCT Filed: Feb. 28, 2020

(86) PCT No.: PCT/KR2020/002909
§ 371 (c)(1),
(2) Date: Feb. 4, 2022

(87) PCT Pub. No.: WO2021/025250
PCT Pub. Date: Feb. 11, 2021

(65) Prior Publication Data
US 2022/0258729 A1    Aug. 18, 2022

(30) Foreign Application Priority Data
Aug. 5, 2019    (KR) .......... 10-2019-0094684

(51) Int. Cl.
*G05D 1/00*    (2024.01)
*B60W 30/09*    (2012.01)
(Continued)

(52) U.S. Cl.
CPC .......... *B60W 30/09* (2013.01); *B60W 30/095* (2013.01); *B60W 60/001* (2020.02);
(Continued)

(58) Field of Classification Search
CPC ..................................... B60W 30/09
See application file for complete search history.

(56) References Cited

U.S. PATENT DOCUMENTS

| | | | |
|---|---|---|---|
| 9,884,585 B1* | 2/2018 | Lubbers | B60W 30/095 |
| 2002/0032506 A1* | 3/2002 | Tokitsu | G07C 5/008 |
| | | | 701/32.4 |

(Continued)

FOREIGN PATENT DOCUMENTS

| | | |
|---|---|---|
| KR | 10-2010-0117861 | 11/2010 |
| KR | 10-2011-0074629 | 6/2011 |

(Continued)

OTHER PUBLICATIONS

PCT International Application No. PCT/KR2020/002909, International Search Report dated Nov. 13, 2020, 5 pages.

*Primary Examiner* — Redhwan K Mawari
*Assistant Examiner* — Paul W Arellano
(74) *Attorney, Agent, or Firm* — LEE, HONG, DEGERMAN, KANG & WAIMEY

(57) ABSTRACT

Presented is a method in which adjacent vehicles sense, while driving, the state of a vehicle having an abnormality, so as to report same to an infrastructure/network, and, further, the infrastructure/network directly senses the abnormality so that the vehicle with the abnormality can be controlled.

14 Claims, 29 Drawing Sheets

(51) Int. Cl.
*B60W 30/095* (2012.01)
*B60W 60/00* (2020.01)

(52) U.S. Cl.
CPC ............... *B60W 2510/0638* (2013.01); *B60W 2554/4049* (2020.02)

(56) References Cited

U.S. PATENT DOCUMENTS

| | | | | |
|---|---|---|---|---|
| 2007/0282519 | A1* | 12/2007 | Emam | G08G 1/164 |
| | | | | 701/117 |
| 2012/0158276 | A1* | 6/2012 | Kim | G08G 1/096783 |
| | | | | 701/119 |
| 2016/0210857 | A1* | 7/2016 | Gao | G08G 1/0129 |
| 2018/0286224 | A1* | 10/2018 | Brodski | G08G 1/052 |
| 2019/0210613 | A1* | 7/2019 | Sun | G05B 23/00 |
| 2020/0133288 | A1* | 4/2020 | Abari | G05D 1/0088 |
| 2021/0116907 | A1* | 4/2021 | Altman | G08C 17/02 |

FOREIGN PATENT DOCUMENTS

| | | |
|---|---|---|
| KR | 10-2012-0067175 | 6/2012 |
| KR | 10-2019-0004567 | 1/2019 |

* cited by examiner (a)

(b)

(a)

(b)

METHOD AND DEVICE FOR SHARING ADJACENT VEHICLE STATE INFORMATION

CROSS-REFERENCE TO RELATED APPLICATIONS

This application is the National Stage filing under 35 U.S.C. 371 of International Application No. PCT/KR2020/002909, filed on Feb. 28, 2020, which claims the benefit of earlier filing date and right of priority to Korean Application No. 10-2019-0094684 filed on Aug. 5, 2019, the contents of which are hereby incorporated by reference herein in their entireties.

BACKGROUND OF THE DISCLOSURE

Field of the Disclosure

The present disclosure relates to wireless communication.

Related Art

V2X means communication between a terminal installed in a vehicle and other terminals, and the other terminals may be a pedestrian, a vehicle, and an infrastructure, and in this case, the other terminals may be sequentially called vehicle to pedestrian (V2P), vehicle to vehicle (V2V), vehicle to infrastructure (V2I), etc.

In V2X communication, data/control information may be transmitted and received through a sidelink defined in a D2D operation other than an uplink/downlink between a base station and the terminal used in conventional LTE communication.

As causes for which the abnormality may occur in the vehicle operation may be generally divided into the abnormality of the driver and a defect of the vehicle itself. When the defect occurs, surrounding vehicles may sense and notify the defect or transmit a warning message. However, addition processing power is required for judging whether the abnormality occurs in the vehicle in addition to the surrounding vehicles transmitting sensing information for an abnormal vehicle to burden the surrounding vehicles.

SUMMARY

The present disclosure proposes a scheme in which a surrounding vehicle senses a status of a vehicle in which abnormality occurs and reports the abnormality to an infrastructure/network during driving and the infrastructure/network directly senses the abnormality to control the vehicle in which the abnormality occurs.

According to the present disclosure, while an excessive processing burden is not given to a terminal of a vehicle, etc., the abnormal vehicle can be sensed and an appropriate action can be taken for the abnormal vehicle.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

DESCRIPTION OF EXEMPLARY EMBODIMENTS

Figure 1:
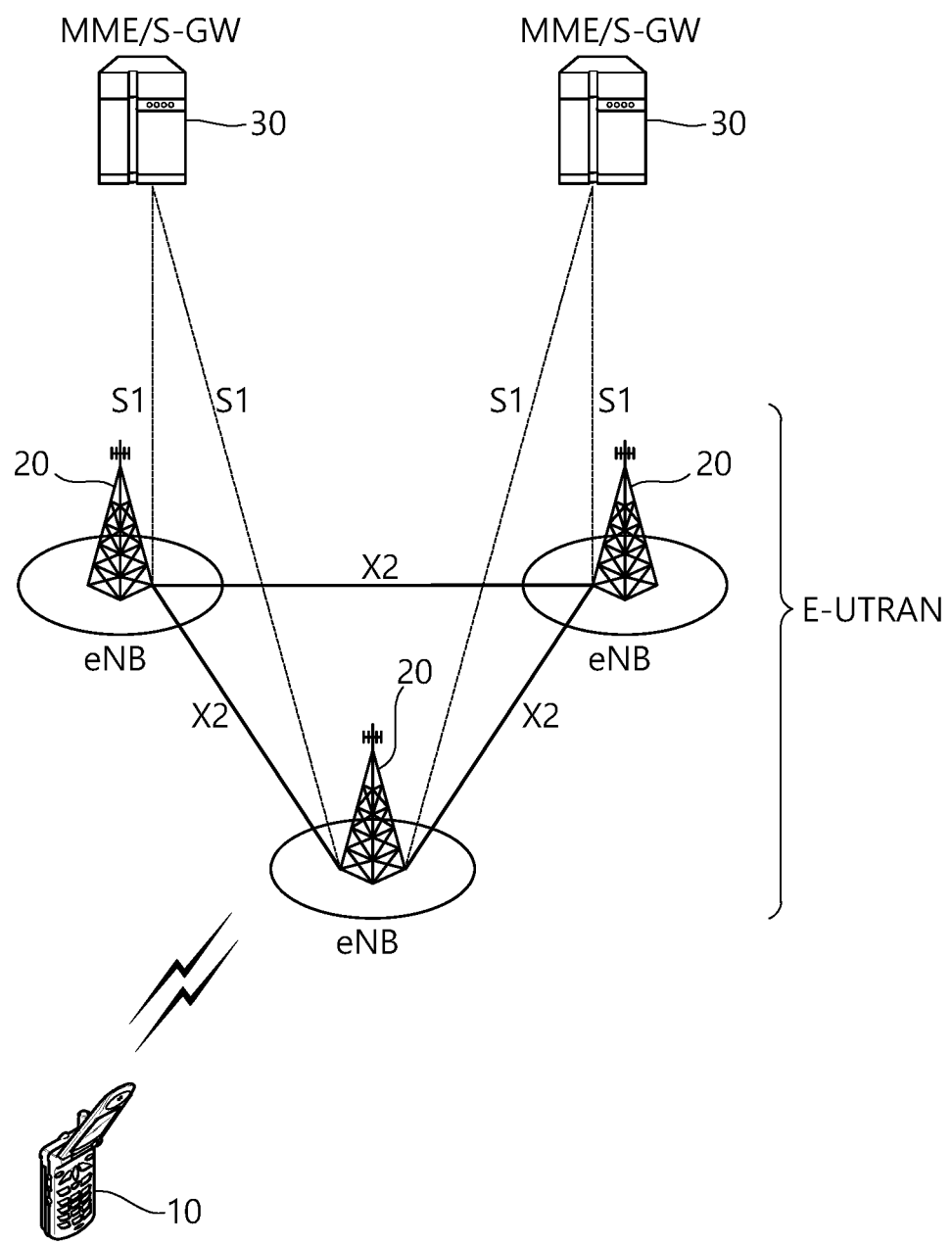
FIG. 1 shows a structure of an LTE system, in accordance with an embodiment of the present disclosure.

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

The following technology may be used for various wireless communication systems which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. IEEE 802.16m as an evolution of IEEE 802.16e provides backward compatibility with a system based on IEEE 802.16e. The UTRA is part of Universal Mobile Telecommunications System (UMTS). 3rd Generation Partnership Project (3GPP) Long Term Evolution (LTE) as a part of Evolved UMTS (E-UMTS) using the E-UTRA (evolved-UMTS terrestrial radio access) adopts OFDMA in downlink and adopts SC-FDMA in uplink. LTE-Advanced (A) is evolution of LTE.

5G NR as subsequent technology is a new clean-slate type mobile communication system having features such as high performance, low latency, high availability, etc. 5G NR may utilize all available spectrum resources such as intermediate frequency band of 1 GHz to 10 GHz, a high-frequency (millimeter wave) band of 24 GHz or more, etc., from a low-frequency band less than 1 GHz.

For clear description, LTE-A or 5G NR is primarily described, but a technical spirit of the present disclosure is not limited thereto. The LTE-A or 5G NR may be referred to as an evolved-UMTS terrestrial radio access network (E-UTRAN) or long term evolution (LTE)/LTE-A system.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicated with the UE 10 and may also be referred to by using different terms, such as evolved-NodeB (eNB), Base Transceiver System (BTS), Access Point (AP), and so on.

The base stations 20 are interconnected to one another through an 23 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
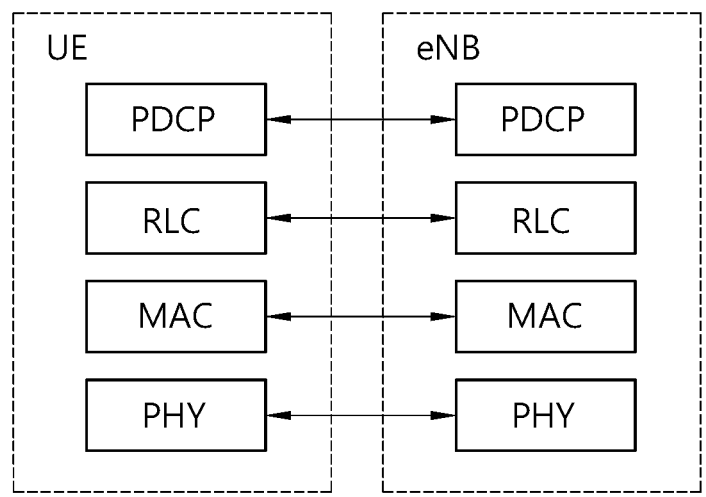
FIG. 2 shows a radio protocol architecture of a user plane, in accordance with an embodiment of the present disclosure.
Figure 3:
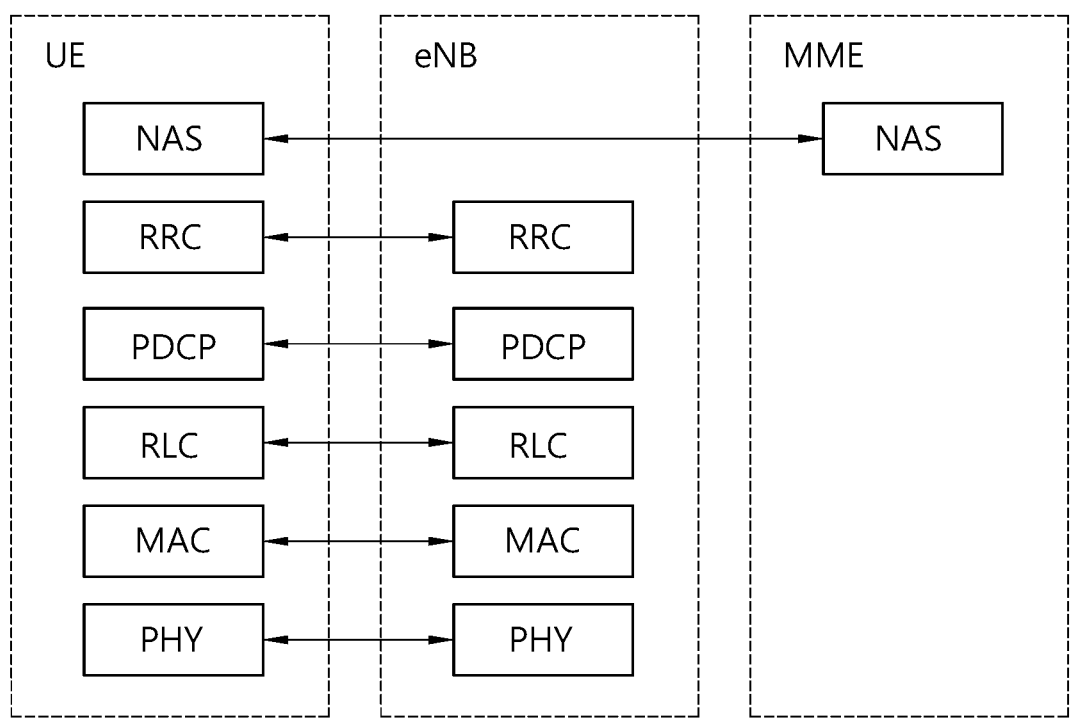
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
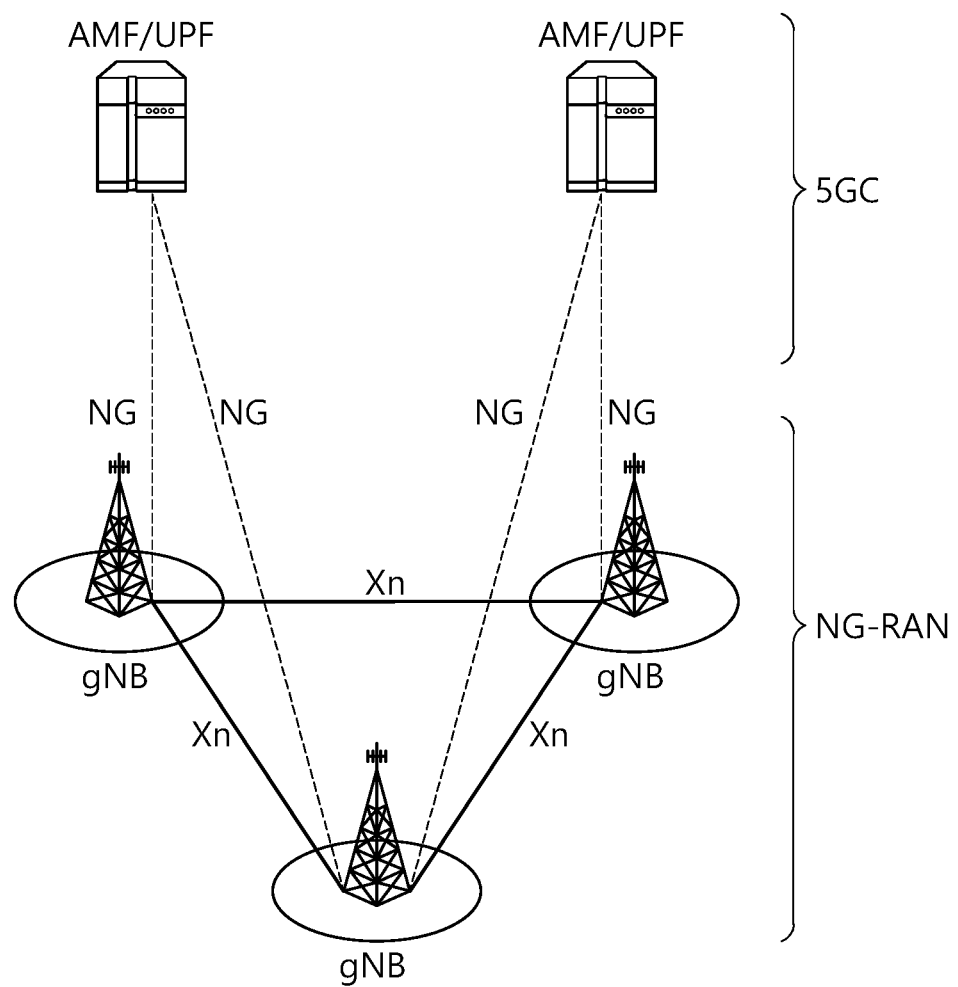
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
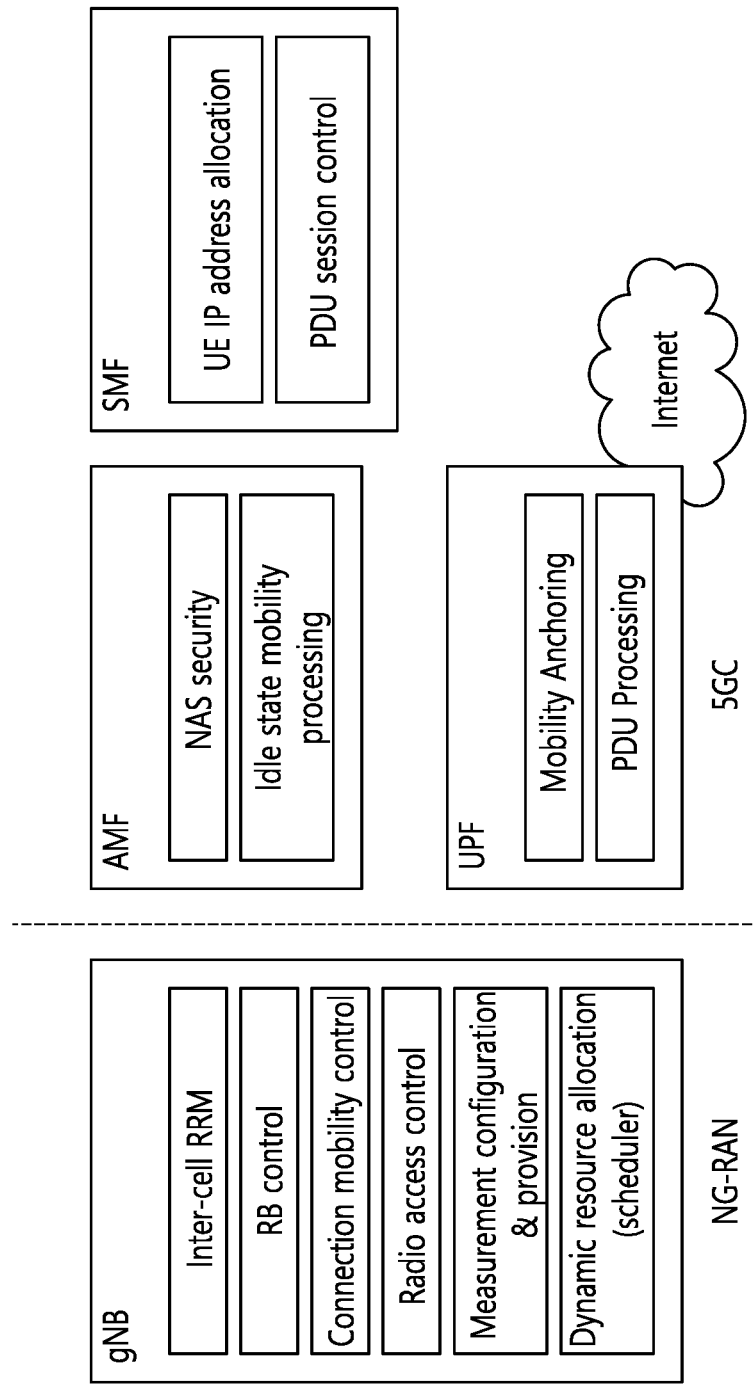
FIG. 5 shows a functional division between an NG-RAN and a SGC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
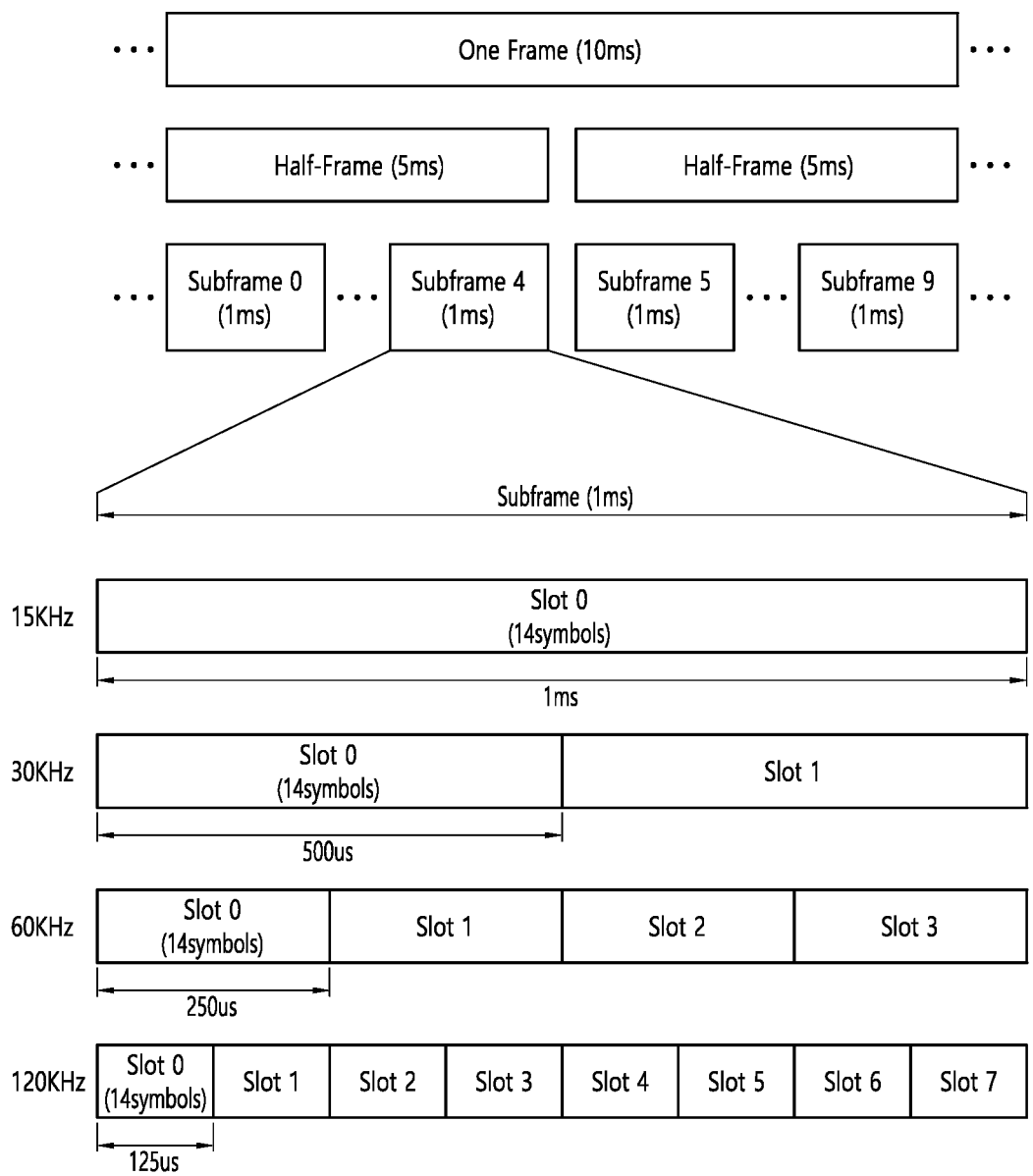
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
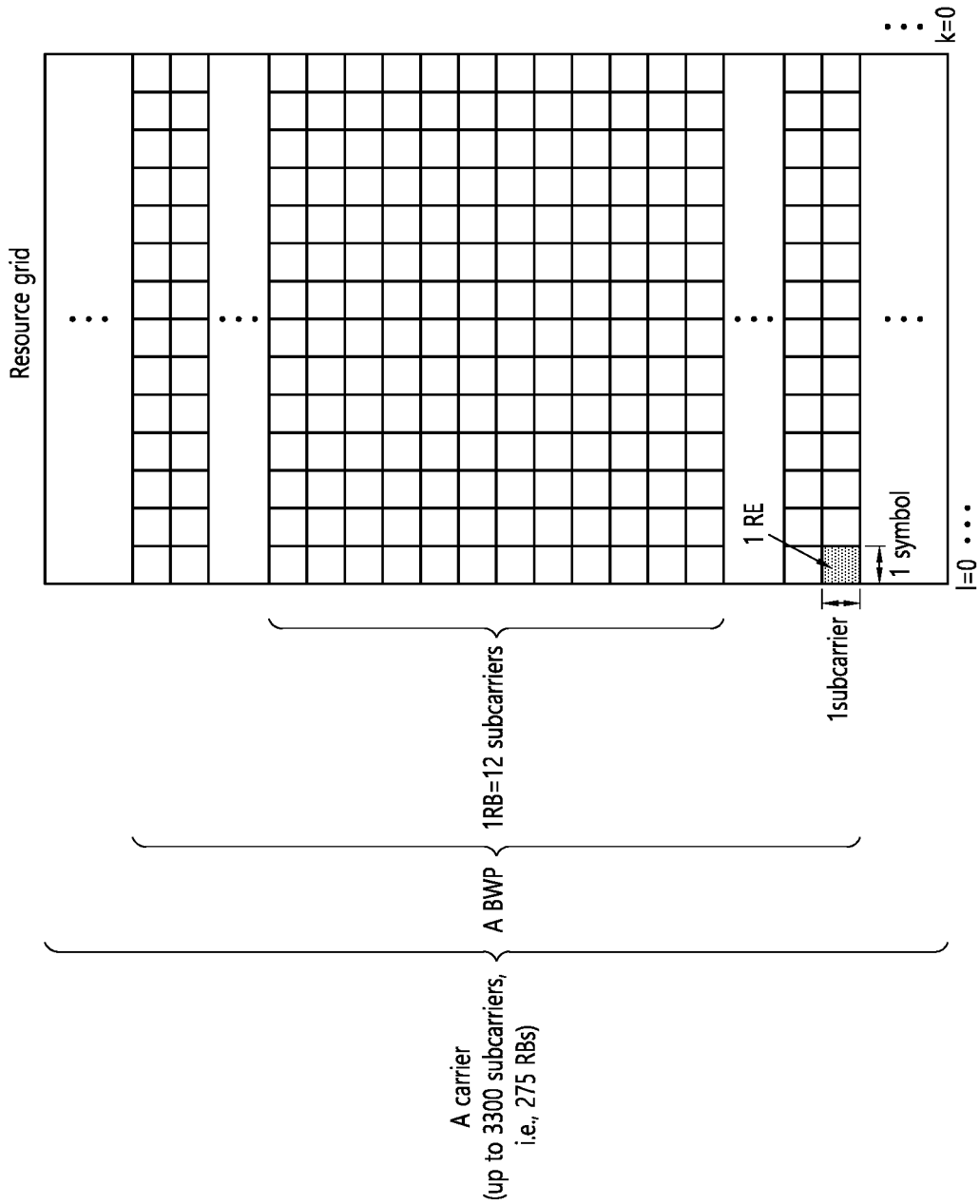
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
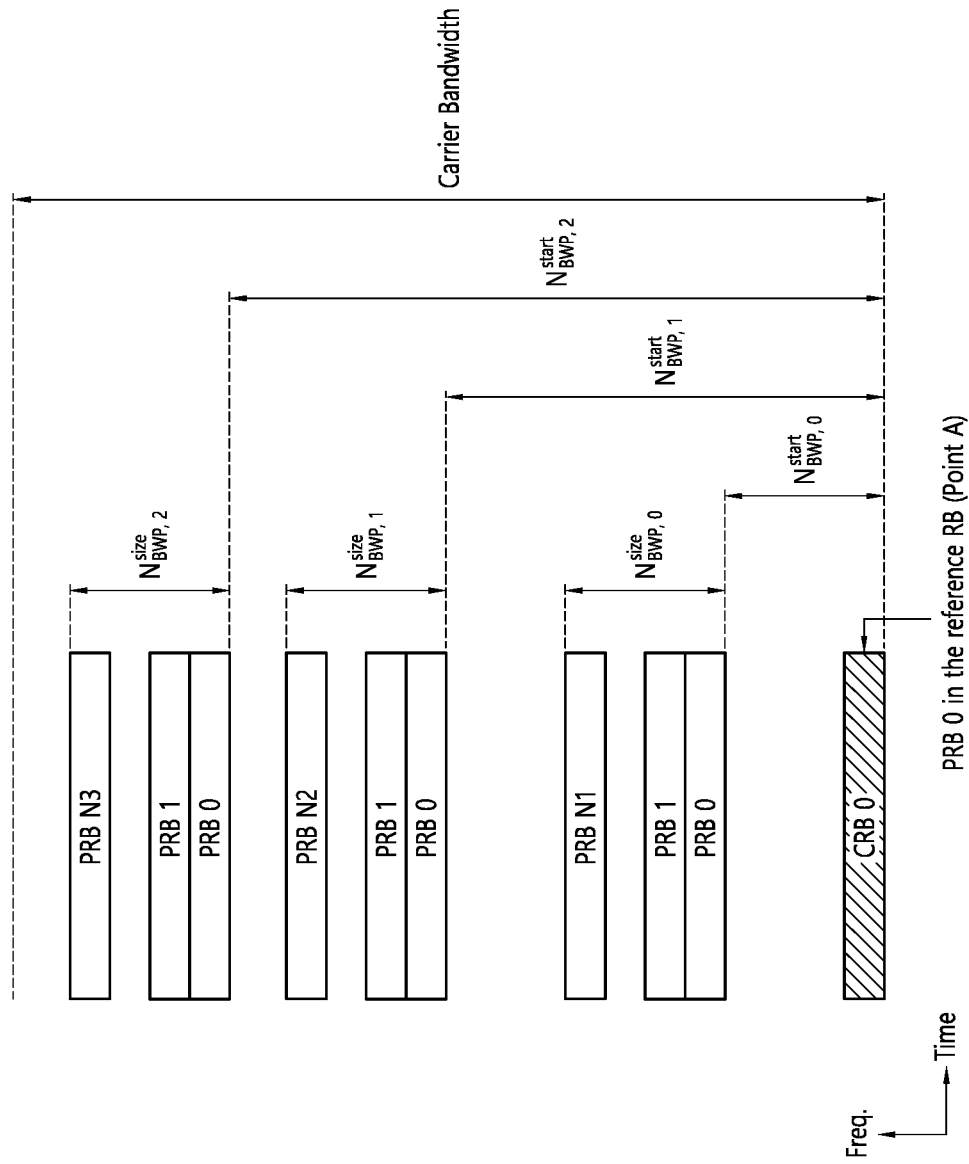
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 9:
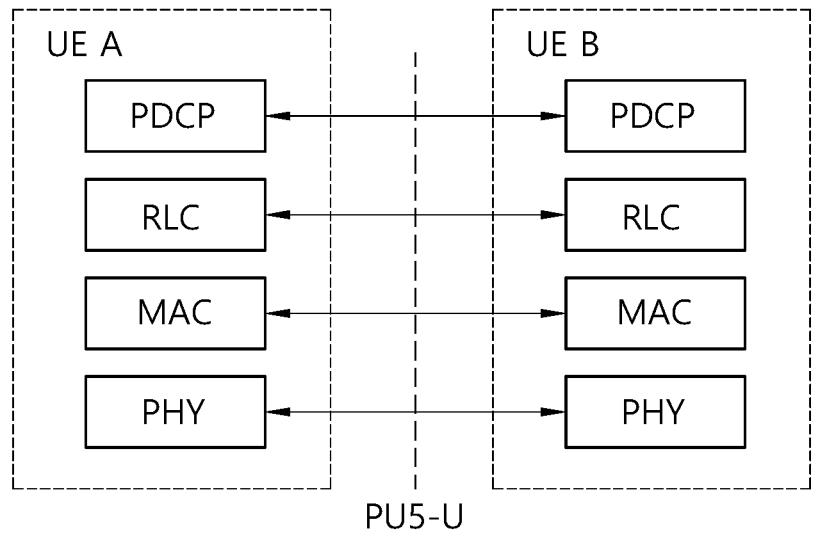
FIG. 9 shows a radio protocol architecture for a SL communication, in accordance with an embodiment of the present disclosure.
Figure 9:
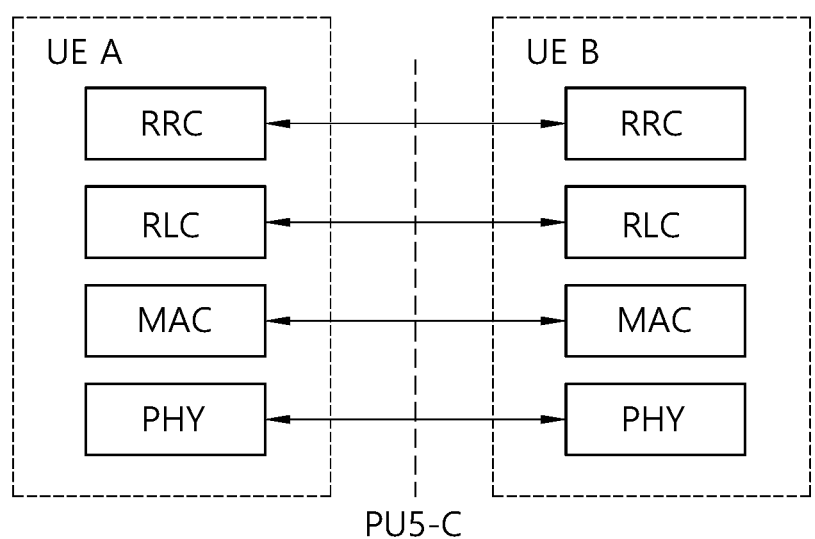

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

Figure 10:
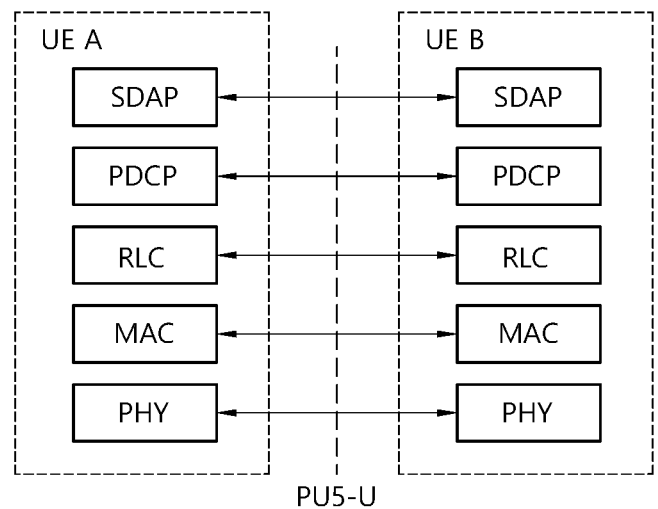
FIG. 10 shows a radio protocol architecture for a SL communication, in accordance with an embodiment of the present disclosure.
Figure 10:
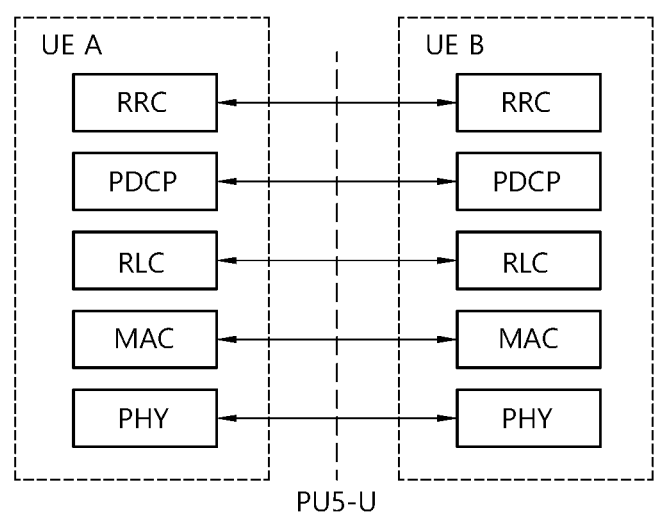

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
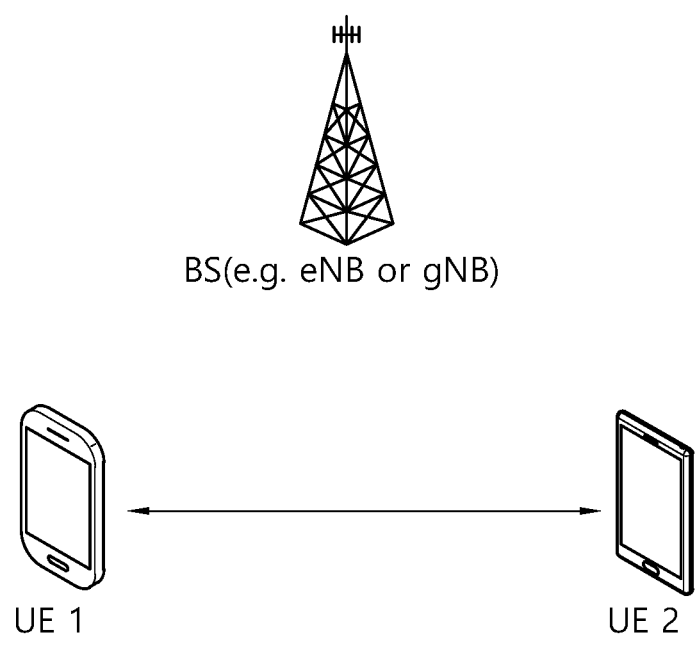
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
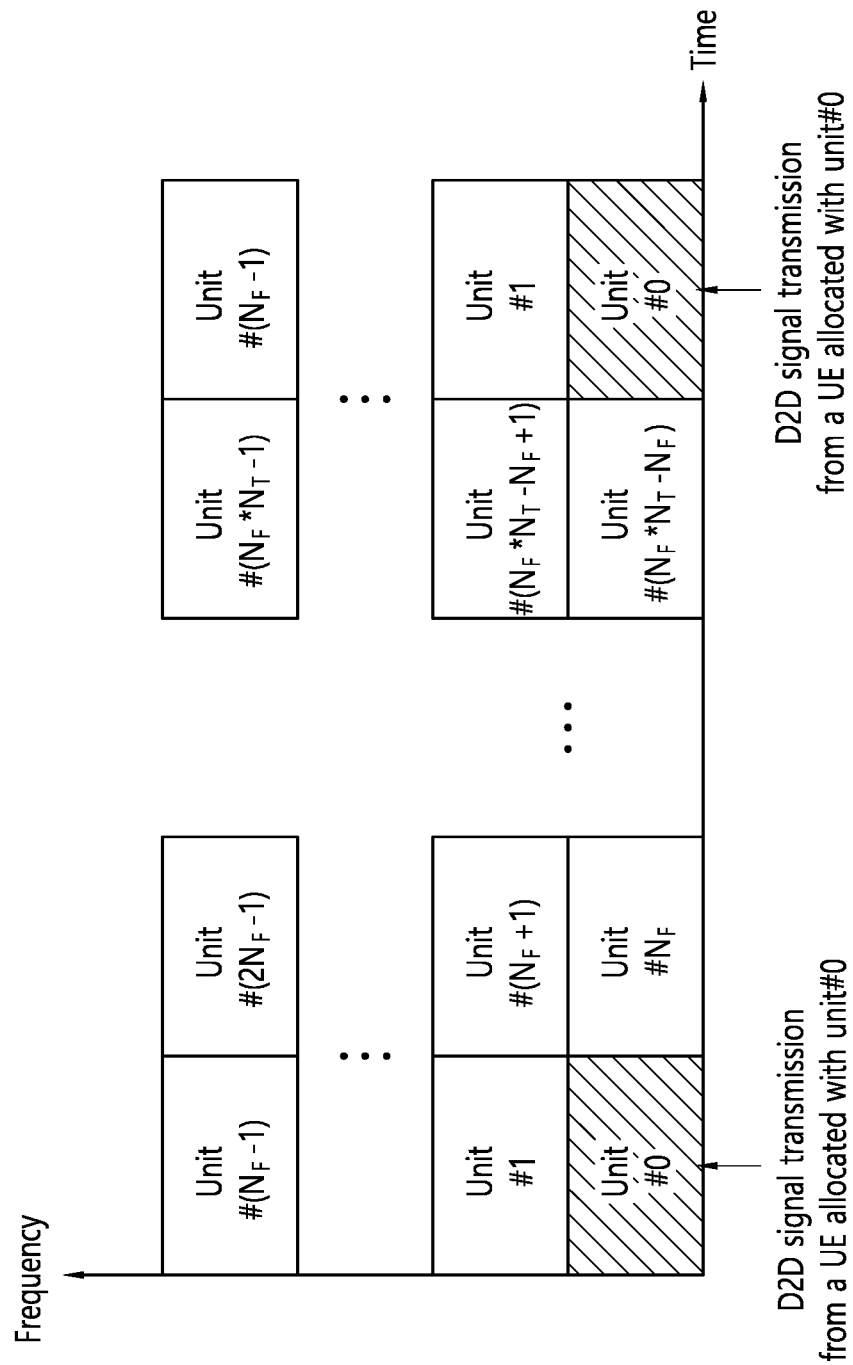
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into $N_F$ resources, and all time resources of the resource pool may be divided into $N_T$ resources. Therefore, $N_F*N_T$ resource units may be defined in the resource pool. FIG. A12 may show an example of a case where a corresponding resource pool is repeated with a period of $N_T$ subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
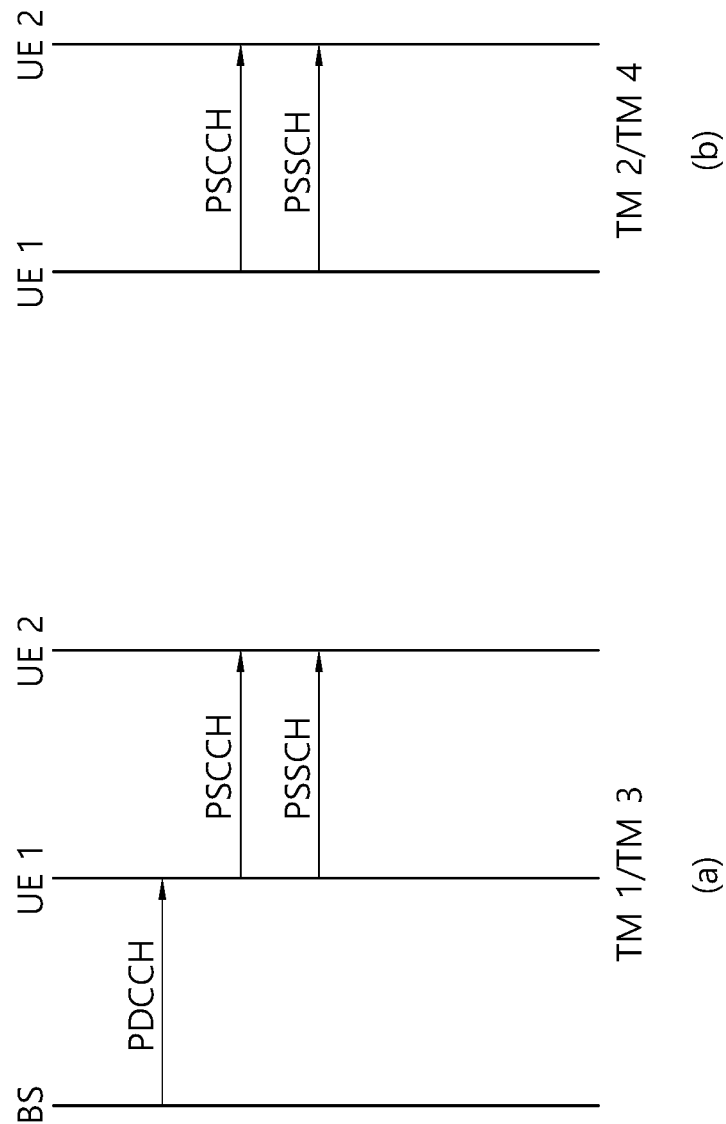
FIG. 13 shows exemplary UE operations according to a transmission mode (TM) related to V2X/D2D in accordance with an embodiment of the present disclosure.

FIG. 13 shows exemplary UE operations according to a transmission mode (TM) related to V2X/D2D in accordance with an embodiment of the present disclosure. (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes ⅓, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes ⅔ may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
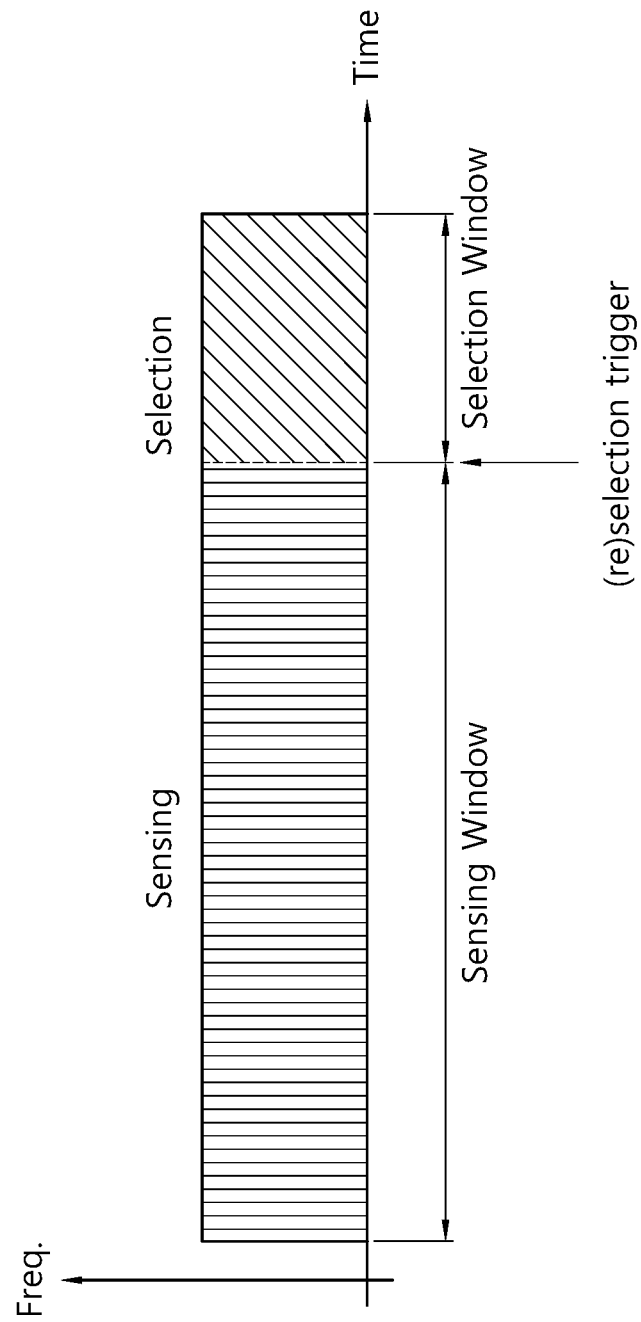
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback may be enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, the proposals of the present disclosure will be described in more detail.

The following drawings are prepared for describing one specific example of the present disclosure. A name of a specific device or a name of a specific signal/message/field disclosed in the drawings is exemplarily presented, so a technical feature of the present disclosure is not limited to a specific name used in the following drawings.

Specifically, the present disclosure proposes a scheme in which a surrounding vehicle senses a status of a vehicle in which abnormality occurs and reports the abnormality to an infrastructure/network during driving or the infrastructure/network directly senses the abnormality to control the vehicle in which the abnormality occurs.

As causes for the occurrence of abnormalities in the vehicle operation may be generally divided into the abnormality of the driver and a defect of the vehicle itself. When the defect occurs, surrounding vehicles may sense and notify the defect or transmit a warning message. However, addition processing power is required for judging whether the abnormality occurs in the vehicle in addition to the surrounding vehicles transmitting sensing information for an abnormal vehicle to burden the surrounding vehicles.

Therefore, the scheme proposed by the present disclosure relates to a method in which a surrounding vehicle of a specific vehicle in which an abnormal status occurs reports sensing information for a target vehicle to a surrounding infrastructure/network or the surrounding infrastructure/network autonomously judges the abnormal status while continuously monitoring the status of the vehicle, and transmits a warning message to surrounding vehicles.

Meanwhile, a driver status monitoring (DSM) device capable of sensing a driver status may not be installed in all vehicles, and a separate device or function may be required for the specific vehicle to sense the abnormal status. Accordingly, a scheme in which the vehicle reports the sensing information for the surrounding vehicles itself to the surrounding vehicle or network and the network judges the sensing information and announces existence of a risk vehicle may be more efficient.

Therefore, in addition to the scheme that avoids the accident risk in the vehicle alone, the present disclosure proposes a method that recognizes the accident risk through sensing information of the surrounding vehicle and propagates information related to the accident risk to the surrounding vehicle, the network, etc., to avoid even a risk of a secondary accident.

To this end, a method may be considered in which when various devices for avoiding the accident risk in the vehicle alone, e.g., the devices such as the DSM device that checks whether the driver sleeps or a health state are installed, information collected by the corresponding device is propagated to surroundings.

However, in spite of the sensing of the DSM device, when the driver does not return to driving in the normal status or the abnormal status occurs in the health, the abnormality of a vehicle operation status may occur or if there is no particular device capable of warning the driver in the vehicle in which the DSM device is not installed, the abnormality of the vehicle operation status may also occur. As such, when a cause of the vehicle abnormality is not solved early, a method for sensing the vehicle abnormality and propagating the vehicle abnormality to the surroundings by the surrounding vehicles is proposed.

Since the method in which the surrounding vehicles sense the abnormal vehicle is a method which may not be used when vehicles do not exist around the abnormal vehicle or when sufficient vehicles do not exist, the present disclosure proposes the method in which the surrounding infrastructure or network senses the abnormal vehicle jointly.

First, hereinafter, network-based vehicle abnormality detection and abnormal vehicle determination method will be described.

If the DSM device is not installed inside the vehicle, the driver status of the vehicle may not be judged. Further, even though the DSM device is installed, DSM information may not derive a result reliably or rapidly enough to prevent an accident of a target vehicle or a secondary accident. Further, the surrounding vehicles traveling while continuously sensing vehicles having a potential accident risk may burden the surrounding vehicles in terms of processing, and a sensor or a Advanced Driver Assistance System (ADAS) device may not be sufficiently installed enough to observe vehicles and measure riskiness.

Accordingly, in a situation in which the vehicles periodically transmit a V2X message, a method in which an entity steadily collecting and managing the V2X message judges the accident riskiness by using the corresponding information and preventing the accident may be efficient. As an example, the vehicle periodically transmits the V2X message in order to directly perform the above-described function and a lot of computations for deriving the accident riskiness are performed by receiving the V2X messages of all surrounding vehicles and furthermore, a process of sharing derived information with surroundings may be required. Accordingly, it may be preferable that an infrastructure (e.g., a road side unit (RSU)) around the road or an RSU having a form in which localized mobile edge computing (MEC) is mounted/network (e.g., eNB and an associated V2X application server) performs the corresponding operation.

The infrastructure/network may continuously receive and store the V2X messages of the surrounding vehicles and as necessary, may derive new information by utilizing the V2X message. As an example, an infrastructure/network that collects location information, path information, etc., of the vehicle through a basic safety message (BSM) may check a driving status by the following scheme.

Steering status: The infrastructure/network may determine a location direction, traffic lane information, etc., of the road through high definition (HD) map possessed thereby, and when the location information included in the received V2X message, etc., is mapped to a high definition map and compared, the infrastructure/network may determine whether the vehicle is driven while accurately keeping the traffic lane or whether the steering status is abnormal. The infrastructure/network may observe the following phenomena by comparing (e.g., average) locations and paths of vehicles which currently travel based on path information of vehicles which normally travel and already pass through the corresponding trajectory in addition to the scheme of comparing the location of the vehicle based on the center of the traffic lane.

1. Abnormal traffic lane leaning phenomenon:

2. Abnormal traffic lane occupation phenomenon: When the abnormal traffic lane leaning phenomenon is continued, the vehicle may deviate from the traffic lane without a turn indicator or without an intention of a change of the traffic lane, or the vehicle may be driven throughout multiple traffic lanes (e.g., traffic lane biting) for a predetermined time or more.

3. Phenomenon in which vehicle is operated while stumbling horizontally: When normal operation is not performed as the driver intends, the vehicle may not move straightly toward the traffic lane, but may be operated while stumbling horizontally.

Acceleration/deceleration status: The infrastructure/network may measure or calculate the acceleration/deceleration from the V2X message (e.g., BSM) received from the vehicle, and observe the following phenomena.

1. Abnormal acceleration phenomenon: In a case where a specific vehicle is accelerated at a predetermined acceleration or more in a situation in which constant speed driving or deceleration driving is required in a traffic flow, the case may be regarded as an abnormal acceleration situation. The infrastructure/network allows a preceding vehicle(s) of the specific vehicle to recognize the abnormal acceleration situation and needs to request the preceding vehicle(s) of the specific vehicle to increase a speed or attempt a traffic lane change for collision prevention.

2. Abnormal deceleration phenomenon: In a case where the specific vehicle attempts sudden stop at a predetermined deceleration or more in a situation in which a traffic flow is smooth, the case may be regarded as an abnormal deceleration situation. The infrastructure/network allows a trailing vehicle(s) of the specific vehicle to recognize the abnormal acceleration situation and needs to request the preceding vehicle(s) of the specific vehicle to decrease a speed or attempt the traffic lane change for the collision prevention.

Meanwhile, the trajectory of the corresponding vehicle needs to be described in order to autonomously check whether the specific vehicle normally travels or whether the specific vehicle abnormally travels on the network. To this end, the network divides the trajectories of the vehicles as a unit of a predetermined interval (e.g., 100 m) and store trajectories for a predetermined time (e.g., 10 minutes) or as large as a predetermined number (e.g., data as many as 100 vehicles).

The steering information and the acceleration/deceleration information may be derived from the trajectory data, and as an example, a reference value for normal traveling may be set to an average value of the corresponding trajectories. Here, as an example, data for the abnormal traveling vehicles and minimum/maximum value information may be excluded upon calculating the average value. Further, as an example, when the reference value of the trajectories and operation trajectory information of a specific vehicle are compared and when a variation of an error for each point is a threshold or more, it may be judged that the specific vehicle is abnormally operated. Here, as an example, the threshold may be 1.5 m. Alternatively, the reference for the acceleration/deceleration, etc., may be previously set as below.

Abnormal acceleration: Case where the specific is accelerated at a predetermined acceleration or more Abnormal deceleration: Case where the specific vehicle attempts to decelerate or suddenly stop at a predetermined deceleration or more Further, the following schemes may exist by a method for comparing with the reference value in order to judge whether the operation trajectory information of the vehicle is normal or abnormal.

(Scheme 1) Comparison of center point of traffic lane and operation trajectory information of abnormality suspicion vehicle: It is checked how the operation trajectory is changed from the corresponding center point while information (e.g., a reference for an absolute value) on the center point of the traffic lane.

(Scheme 2) Comparison of trajectories of conventional vehicles and operation trajectory information of abnormality suspicion vehicle: The scheme is a scheme available when the traffic lane is accurately distinguished and there is no change in traffic lane information due to a road construction, etc., and a case where the abnormality suspicion vehicle is not operated based on only the center of the traffic lane particularly occurs in an actual situation. Accordingly, in this case, the trajectories of the conventional vehicles which are normally operated may become a reference value for the normal operation.

Alternatively, movements of vehicles which are positioned at a viewing angle may be tracked and whether there is the abnormal vehicle may be determined by performing image processing by a vehicle control CCTV installed in the RSU.

Whether the vehicle is normally operated may be determined by the following scheme while the reference value of the vehicle operation trajectory is determined by the following scheme. In this case, all vehicles may be checked in order to more safely maintain road traffic or only a vehicle reported to have an abnormal sign may be checked in order to reduce a computation amount of performing the corresponding operation.

As an example, when a reference value and an actual measurement value are input into a comparison device, a comparison value (i.e., a difference value or an absolute value for the difference value) for the corresponding point may be continuously stored during the predetermined interval (e.g., 100 m). In this case, an average and/or a distribution value (i.e., square values of samples are added and averaged, and a square root is acquired) for the stored value are/is acquired to check whether the reference (e.g., a change of the error is 1.5 m or more) is satisfied.

The infrastructure/network may directly transmit a warning message to vehicles that access within predetermined distances (e.g., ranges of left 5 m, right 5 m, front 10 m, and rear 10 m) of a periphery, e.g., left, right, front, and rear sides of the vehicle determined as the abnormal vehicle, or transmit a message for corresponding risk region information. Here, for example, the risk region information may include location and risk zone information of the risk vehicle and a size value for a risk zone may be set and defined in advance.

Figure 15:
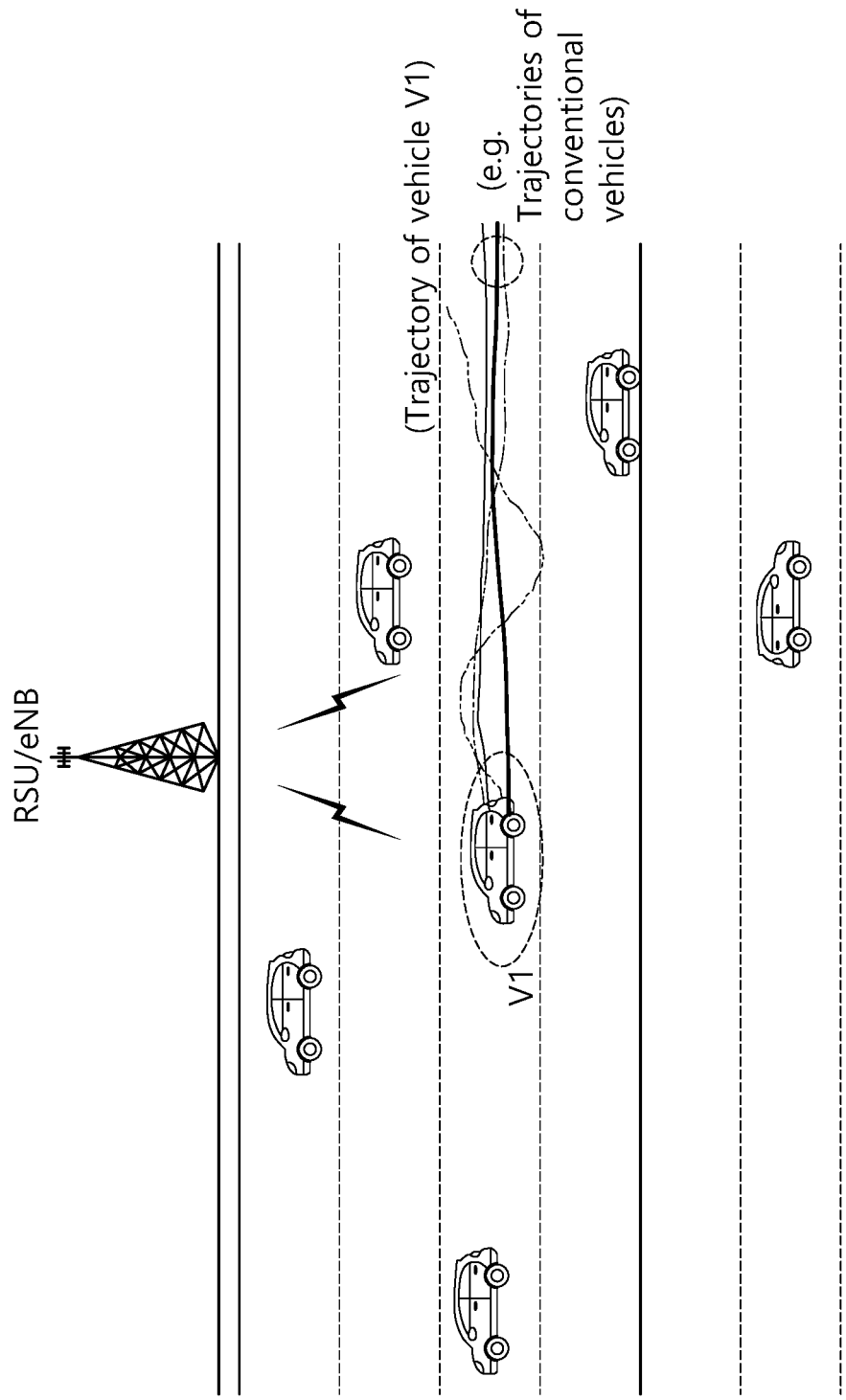
FIG. 15 schematically illustrates an example of a method for detecting an abnormal vehicle according to some implementations of the present disclosure.

FIG. 15 schematically illustrates an example of a method for detecting an abnormal vehicle according to some implementations of the present disclosure.

Referring to FIG. 15, a roadside unit or a base station may detect an abnormal vehicle for a certain section of a road. Here, the roadside unit or the base station may cumulatively store information on driving traces or driving routes of vehicles passing through the predetermined section. Here, the information may include speed, acceleration, driving direction, and the like.

Here, the specific vehicle V1 may travel with a greater amount of change in the driving trajectory compared to the driving trajectories of existing vehicles. For example, the vehicle V1 may be driven with an amount of change exceeding the average from the center point of the lane. In this case, the roadside unit or the base station may determine the vehicle V1 as an abnormal vehicle.

Meanwhile, although FIG. 15 shows only an example of a method for detecting an abnormal vehicle based on a driving trajectory, it is natural that the abnormal vehicle may be detected based on various criteria such as speed and acceleration.

Hereinafter, messages related to vehicle status will be described.

As described above, the abnormal vehicle related information acquired by the surrounding vehicles may be configured by a separate message, and transmitted through the V2X device or included in a conventional V2X message or a modified V2X message, and transmitted. ID information for the vehicle or message, corresponding vehicle location information, etc., may be jointly transmitted or derived from another message (e.g., a BSM message transmitted by the corresponding vehicle).

The information acquired from the DSM device may be transmitted jointly with the conventional V2X message or included in the modified V2X message or an extended V2X message or configured as the separate message and transmitted through the V2X device. In this case, a field configuring the corresponding message may relate to the status of the driver and/or the status of the vehicle. ID information for the vehicle or message, corresponding vehicle location information, etc., are included in the message and transmitted or derived from another message (e.g., a BSM message transmitted by the corresponding vehicle) or another field of the corresponding message.

As the DSM information, the following information may be transmitted selectively or in combination according to motions of the target vehicle and a surrounding vehicle or a network receiving the DSM information.

Information on risk zone: The infrastructure/network senses the abnormality of the driving status of the specific vehicle, and as a result, how the specific vehicle influences the surrounding vehicle or at which degree neighboring vehicles sense the risk of the accident due to the specific vehicle may be estimated. That is, when another vehicle enters such a zone, the corresponding vehicle may judge a situation thereof as the risk situation. As an example, a risk radius or a risk zone around the specific vehicle may be set by the following schemes.

Left separation distance: As an example, when a reference for judging that the vehicle is operated while stumbling horizontally by abnormal steering is s(m), this value (e.g., s=1.5 m) as an offset value from the center of the traffic lane may also be set to the dangerous zone or a value in which the vehicle is actually maximally biased to the left side may also be designated as an offset. In this case, when the center of the vehicle matches a left line (e.g., in the case of a road having a width of 3.5 m, when the vehicle is biased to the left side by 1.75 m), it may be judged that the vehicle is maximally leaned to one direction, and as a result, the corresponding value may also be set as the dangerous zone. More specifically, the dangerous zone may be set to be equal to a value acquired by adding a half of a vehicle width to the value. Further, in the above case, the direction of the vehicle may not be particularly a straight direction and may be twisted from a traffic line direction at any degree of angles. As an example, when the direction of the vehicle is twisted at 90 degrees, the dangerous zone may be equal to not a value acquired by the half of the vehicle width to the offset value as described above, but a value acquired by adding a half of a vehicle length to the offset value.

As an example, when the center of the vehicle matches the left line of the traffic lane (e.g., in the case of the road having the width of 3.5 m, when the vehicle is biased to the left side by 1.75 m), if the vehicle is twisted to the left side in the direction of 90 degrees (e.g., in the case of a 5 m vehicle, if 2.5 m is added to the offset value), a left dangerous zone as large as a total of 4.25 m is expected. When a worst case is considered, a vehicle at the left side may be a vehicle having abnormal steering. When it is assumed that left and right dangerous zones are the same, the left vehicle also has a right dangerous zone of 4.25 m, and when this is considered, a size of the left dangerous zone may be set to 8.5 m (4.25 m*2).

Right separation distance: As described above, methods which may be applied to the left separation distance may be applied to the right separation distance. As an example, as described above, the size of the right dangerous zone may be set to 8.5 m. Alternatively, when a left steering abnormal state and a right steering abnormal state are different from each other (e.g., when the vehicle is leaned mainly only to the left side), the above, i.e., the dangerous zone size values which are the same at the left and right sides need not particularly applied.

Front separation distance: As an example, a value of the front separation distance may be determined based on an acceleration size (e.g., 1 m/s$^2$) corresponding to the rapid acceleration, and when a time of approximately 5 seconds is required by considering a message reception and reaction time, a specific vehicle of 20 m/s (72 km/h) (here, when it is assumed that a front vehicle of the specific vehicle also has the same speed) may follow behind the front vehicle by 12.5 m for 5 seconds upon rapid acceleration, as an example. Accordingly, when the value becomes the dangerous zone size of a front direction or in a worst case, when the front vehicle performs the rapid deceleration, the specific vehicle may follow behind the front vehicle by 25 m for 5 seconds. Accordingly, in this case, the size of the front dangerous zone may be set to 25 m (12.5 m*2).

Rear separation distance: As described above, methods which may be applied to the front separation distance may be applied to the rear separation distance. As an example, as described above, the size of the rear dangerous zone may be set to 25 m. Alternatively, when the rapid acceleration value and the rapid deceleration value are different from each other (e.g., the size of the deceleration or acceleration is larger, the dangerous zone size value need not be particularly applied.

Figure 16:
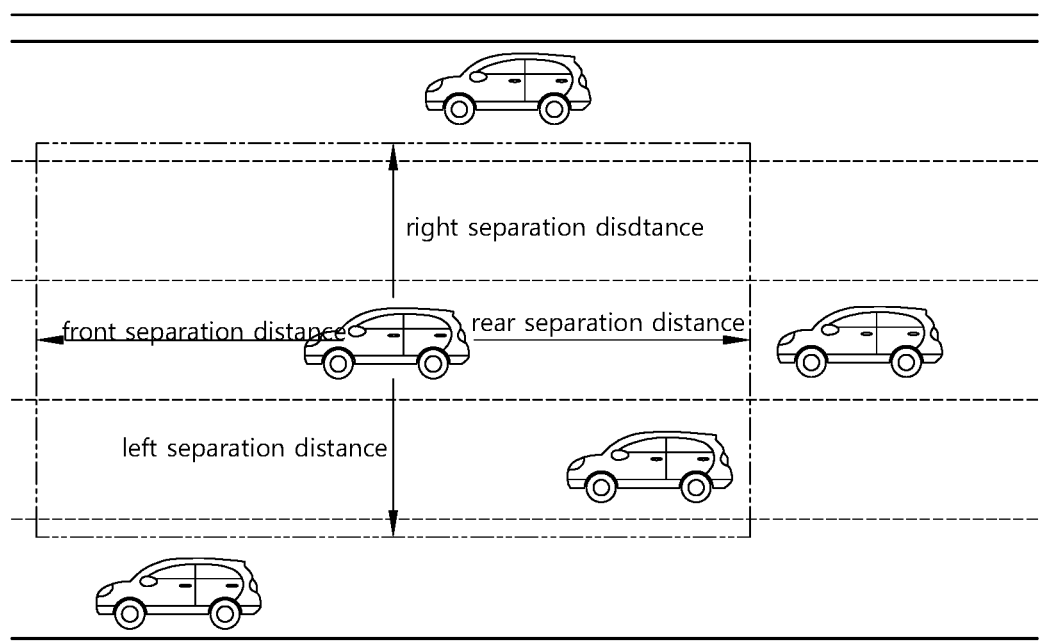
FIG. 16 schematically illustrates an example of a method for configuring a danger radius or danger zone according to some implementations of the present disclosure.

FIG. 16 schematically illustrates an example of a method for configuring a danger radius or danger zone according to some implementations of the present disclosure.

Referring to FIG. 16, it is assumed that the RSU or the base station detects the vehicle V1 as an abnormal vehicle. Here, the RSU or the base station may acquire information on the speed, driving direction, etc. of the vehicle V1. The RSU or the base station may determine a hazardous area based on the vehicle V1 based on the information.

After the RSU or base station determines the danger zone, the RSU or base station may transmit information on the danger zone to vehicles in the danger zone. Further, information on the danger zone may be transmitted to vehicles adjacent to the danger zone, vehicles scheduled to enter the danger zone, and the like.

Alternatively, the RSU or the base station may instruct the surrounding vehicles of the specific vehicle to perform a required operation. As an example, when the specific vehicle is rapidly decelerated, the RSU or the base station may request a preceding vehicle of the specific vehicle to be driven slowly or change the traffic range, and when the specific vehicle is rapidly accelerated, the RSU or the base station may request a trailing vehicle of the specific vehicle to secure an inter-vehicle distance by increasing the speed or change the traffic lane. When left steering abnormality or right steering abnormality occurs, the RSU or the base station may request a left or right vehicle of the specific vehicle to be slowly driven or change the traffic lane to a more outside traffic lane.

Figure 17:
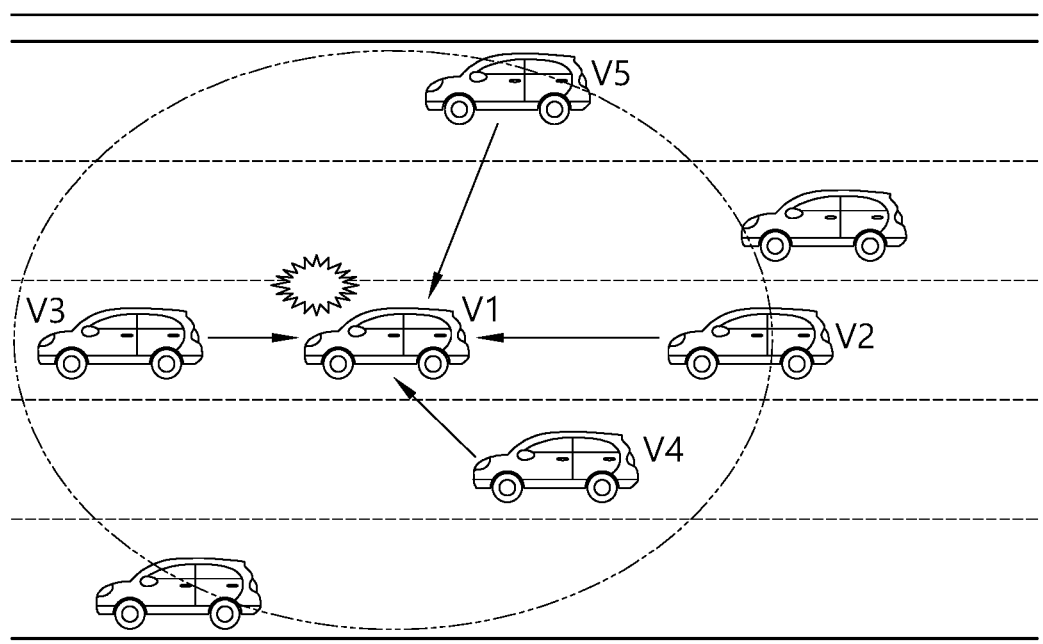
FIG. 17 shows an example of a method of notifying a necessary operation to surrounding vehicles of an abnormal vehicle according to some implementations of the present disclosure.

FIG. 17 shows an example of a method of notifying a necessary operation to surrounding vehicles of an abnormal vehicle according to some implementations of the present disclosure.

Referring to FIG. 17, it is assumed that vehicle V1 is a vehicle that is operating abnormally, and vehicles V2, V3, V4, and V5 are operating around the vehicle V1.

In this case, if the RSU or the base station detects that the vehicle V1 is operating abnormally, the RSU or the base station may instruct the vehicles V2 to V5 to perform a necessary operation. For example, if the vehicle V1 is rapidly accelerating, the RSU or the base station may command the vehicle V3 to accelerate or change lanes, and if the vehicle V1 is rapidly decelerating, the RSU or the base station may command the vehicle V2 to decelerate or change lanes. In addition, for example, when steering abnormality occurs to the left or right of vehicle V1, the RSU or the base station may command deceleration or lane change to vehicle V4 or V5, respectively.

Alternatively, when the vehicle V1 is an abnormal vehicle, the RSU or the base station may inform the vehicles V2 to V5 of information about the danger zone. The information may inform the location, speed, driving direction, etc. of the vehicle V1. Vehicles V2 to V5 may prevent a collision with the vehicle V1 based on the information.

Hereinafter, a vehicle driving mode switching method will be described.

When the abnormal sign occurs in a driver of a specific vehicle or when the specific vehicle is abnormally operated, if the specific vehicle does not return to a normal operation mode even through warning messages and notifications of surrounding vehicles, the specific vehicle may be in accident danger. The driving mode may be switched as below in response thereto.

However, in the driving mode switching, a type of an option which may be selected by a capability of the vehicle may be determined. As an example, among vehicles having no autonomous driving function, no driving assistance function, etc., a vehicle which also has a minimum emergency braking function has no function which the vehicle may autonomously perform, surrounding vehicles cannot but be careful.

On the contrary, when the corresponding vehicle includes a tele-operated driving (ToD) function, a scheme of switching to the corresponding mode may be considered. Further, it may be difficult that a vehicle of autonomous driving level 3 or more moves up to a final destination, but a motion of moving the vehicle up to a safe place may be possible. Further, in the case of a vehicle of autonomous driving level 4 or more, a motion of moving up to the final destination may be considered. Meanwhile, when the vehicles of autonomous driving level 3 or more include the ToD function, any one of autonomous driving and tele-operated driving may be selectively performed (e.g., a function preferred by the user is set in advance, etc.).

Meanwhile, here, the autonomous driving level may be as follows. The autonomous driving level 0 may be a stage in which the driver always controls and the system provides assistance in an emergency situation. Autonomous driving level 1 may be a stage in which the system provides steering or speed control, which may be a stage in which limited assistance is provided. Autonomous driving level 2 may be a stage where the system controls steering and speed. Autonomous driving level 3 may be a stage in which the driver intervenes in an emergency situation. The autonomous driving level 4 may be a stage in which driver intervention is not required. The autonomous driving level 5 may be a stage in which a driver is not required and fully autonomous driving is supported.

Switching to autonomous driving mode: Even at a time point before or after reporting the driver status to the surrounding vehicles and/or the infrastructure/network as described above, when up to a collision risk time (hereinafter, time-to-collision, TTC) remains to a preset specific threshold time or less, a specific vehicle may be switched to the autonomous driving mode and operated as compared with a collision with the surrounding vehicles. However, in a vehicle which does not have the autonomous driving mode or a vehicle in which a full autonomous driving mode (e.g., autonomous driving level 5) is not supported, an autonomous driving mode of a highest level (e.g., autonomous driving levels 0 to 4) applicable may be applied through the ADAS function. Alternatively, the vehicle may be first stopped through an emergency brake function. When the specific vehicle operates in the autonomous driving mode or is emergently braked and stopped, since there is the risk of the secondary accident, the driver status or the operation status of the vehicle needs to be continuously announced to the surrounding vehicles and/or the infrastructure/network as described above.

Switching to escort driving mode: When the status of the driver and/or the vehicle is transmitted through the V2X message, the surrounding vehicle may be driven while leading the corresponding vehicle in the escort driving mode for accident prevention. A surrounding RSU or base station may discriminate which vehicle among the surrounding vehicles is suitable for escorting the specific vehicle. As an example, when a path of the specific vehicle partially or fully overlaps with the path of the abnormal vehicle, the specific vehicle becomes a candidate vehicle which may escort the abnormal vehicle, and in this case, a distance of the specific vehicle from the abnormal vehicle should be within a predetermined range. As an example, the predetermined range may be a distance enough so as the TTC of the specific vehicle to be maintained to the specific threshold time or more when the abnormal vehicle accesses the specific vehicle. The RSU or the base station may match a most appropriate vehicle among candidate vehicles and instruct the matched vehicle. When the escort vehicle is close to the abnormal vehicle, the escort vehicle may be driven by escorting the corresponding abnormal vehicle to a safe point with a control right for the abnormal vehicle. In this case, the status of the abnormal vehicle may be changed until escorting driving is established, and a particular measure may not be required up to a time point when the TTC is equal to or more than the specific threshold, but the escort vehicle may be driven in the autonomous driving mode at a time point when the TTC is less than the specific threshold time.

Switching to tele-operated driving mode: When a specific terminal transmits the status of the driver and/or the vehicle through the V2X message, the corresponding specific vehicle or surrounding vehicle may request tele-operated driving up to the safe point to a surrounding base station. When the base station reports this to a tele-operated driving center and a tele-operated driving driver is matched, the corresponding vehicle may be remotely driven up to the safe point with the control right for the specific vehicle. In this case, the status of the specific vehicle (e.g., a collision risk increases, etc.) may be changed until the tele-operated driving is established, and a particular measure may not be required up to a time point when the TTC is equal to or more than the specific threshold, but the specific vehicle may be driven in the autonomous driving mode at a time point when the TTC is less than the specific threshold time.

Hereinafter, a vehicle status related message will be described.

As described above, the abnormal vehicle related information acquired in the network such as the RSU, the base station, etc., may be configured as the separate message, and transmitted to the abnormal vehicle and/or the surrounding vehicles. Alternatively, the abnormal vehicle related information may be included in the conventional V2X message or the modified V2X message, and transmitted.

Meanwhile, ID information for the vehicle or message, corresponding vehicle location information, etc., may be jointly transmitted or derived from another message (e.g., a BSM message transmitted by the corresponding vehicle).

The information which may be included in the vehicle status related message is as follows.

Abnormal vehicle warning or driving abnormality warning: may include location information, status information, the risk radius, etc., related to the abnormal vehicle.

Surrounding vehicle operation designation: may designate a surrounding vehicle operation for accident avoidance. For example, the acceleration, the deceleration, the traffic lane change, etc., may be designated.

Furthermore, specific speeds, accelerations, directions, etc., may be jointly designated.

Figure 18:
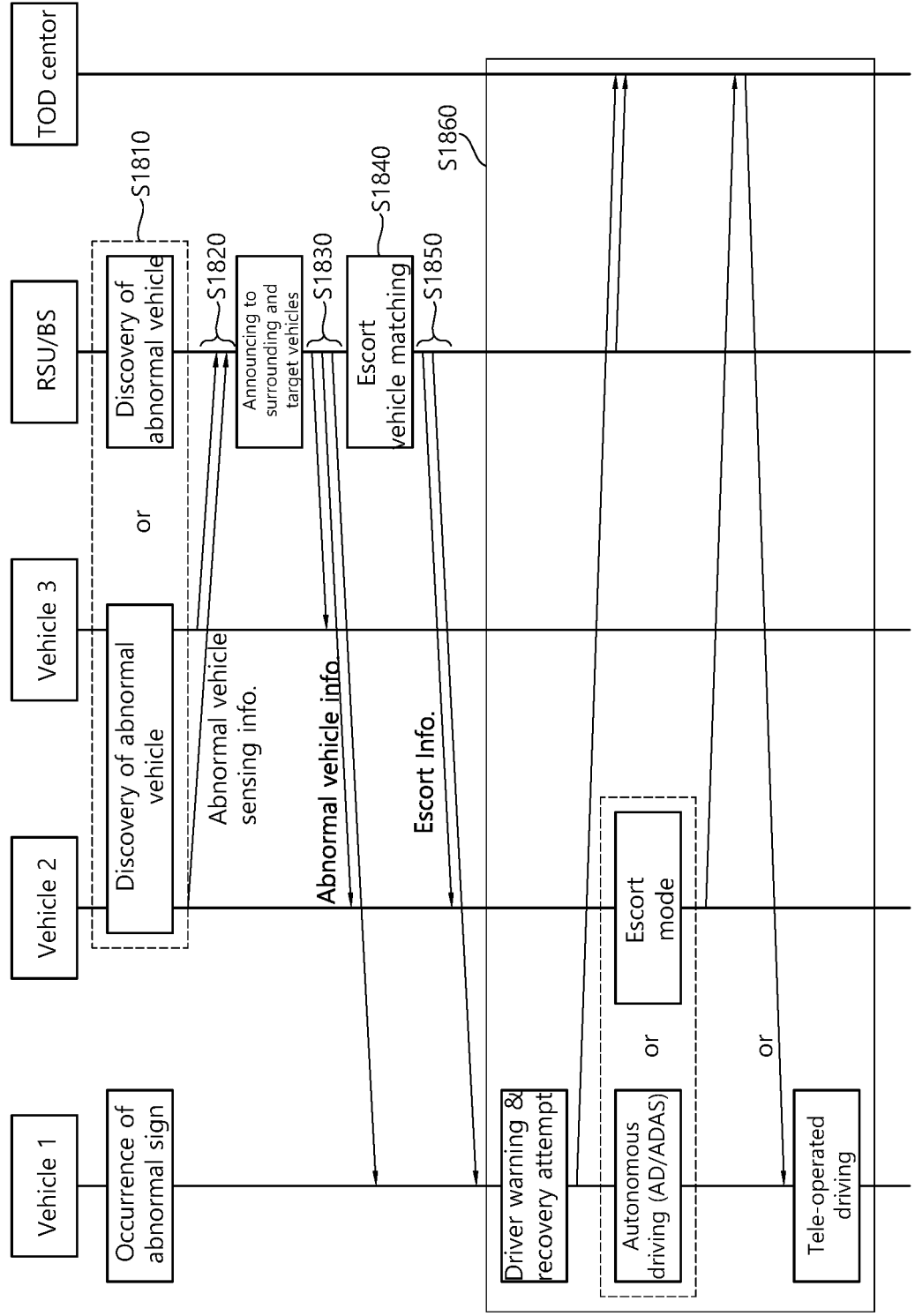
FIG. 18 is a flowchart of an example of a method for determining an abnormal vehicle and transmitting information related to an abnormal vehicle according to some implementations of the present disclosure.

FIG. 18 is a flowchart of an example of a method for determining an abnormal vehicle and transmitting information related to an abnormal vehicle according to some implementations of the present disclosure.

Referring to FIG. 18, the RSU, the base station, the vehicle 2 and/or the vehicle 3 may discover an abnormal vehicle (S1810). Here, the abnormal vehicle may be a vehicle 1. Vehicle 2 and vehicle 3 may be adjacent vehicles of the vehicle 1.

Here, vehicle 2 and/or vehicle 3 may transmit abnormal vehicle detection information to the RSU or the base station (S1820).

Thereafter, the RSU or the base station may transmit abnormal vehicle information to vehicle 1, vehicle 2, and vehicle 3 (S1830). Here, the abnormal vehicle information may be transmitted to each of vehicle 1, vehicle 2, and vehicle 3 based on unicast or broadcast.

Thereafter, the RSU or the base station may match an escort vehicle (S1840).

Here, for example, the vehicle 2 may be determined as the escort vehicle. Then, the RSU or the base station may transmit escort information to the vehicle 1 and the vehicle 2 (S1850).

Thereafter, the vehicle 1 may try to restore itself, operate in an escort mode, or operate in a remote driving mode (S1860). Specifically, vehicle 1 may transmit a warning message or attempt recovery by itself. Thereafter, the vehicle 1 or the RSU or the base station may request a remote driving to the ToD center. Alternatively, the vehicle 1 may perform an autonomous driving operation. Alternatively, the vehicle 2 may operate in an escort mode. Here, the vehicle 2 may report the escort mode operation to the ToD center (remote driving center). Thereafter, the ToD center may inform the remote driving of the vehicle 1. Thereafter, the vehicle 1 may perform a remote driving operation.

Figure 19:
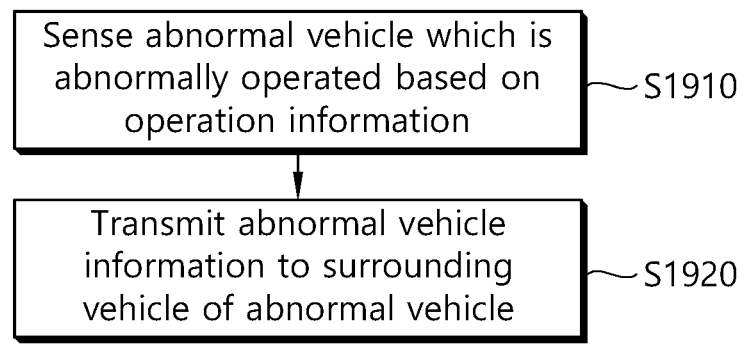
FIG. 19 is a flowchart for an example of a method of operation of an RSU according to some implementations of the present disclosure.

FIG. 19 is a flowchart for an example of a method of operation of an RSU according to some implementations of the present disclosure.

Referring to FIG. 19, the RSU detects an abnormal vehicle operating abnormally based on operation information (S1910).

Thereafter, the RSU transmits abnormal vehicle information to surrounding vehicles of the abnormal vehicle (S1920).

Here, the driving information may include an average driving trajectory of a specific number of vehicles for a specific region and a specific time section. Also, here, the abnormal vehicle information may include at least one of information related to the abnormal vehicle and information related to a relationship between the abnormal vehicle and the surrounding vehicle.

In addition to this, since various examples described in the present disclosure may be applied to the example of FIG. 19, a redundant description will be omitted.

Claims disclosed in the present disclosure may be combined by various schemes. For example, technical features of method claims of the present disclosure may be combined and implemented by the device, and technical features of device claims of the present disclosure may be combined and implemented by the method. Further, the technical features of the method claims and the technical features of the device claims of the present disclosure may be combined and implemented by the device, and the technical features of the method claims and the technical features of the device claims of the present disclosure may be combined and implemented by the method.

Furthermore, the contents and the proposed methods throughout the present disclosure may be performed by the RSU or performed by such as the base station such as eNB, gNB, etc. However, in a specific operating method, the case where the contents and the proposed methods are performed by the RSU and the case where the contents and the proposed methods are performed by the base station may be different from each other in terms of a frequency band and an interface (PC5 or Uu).

Hereinafter, an example of a communication system to which the present disclosure is applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
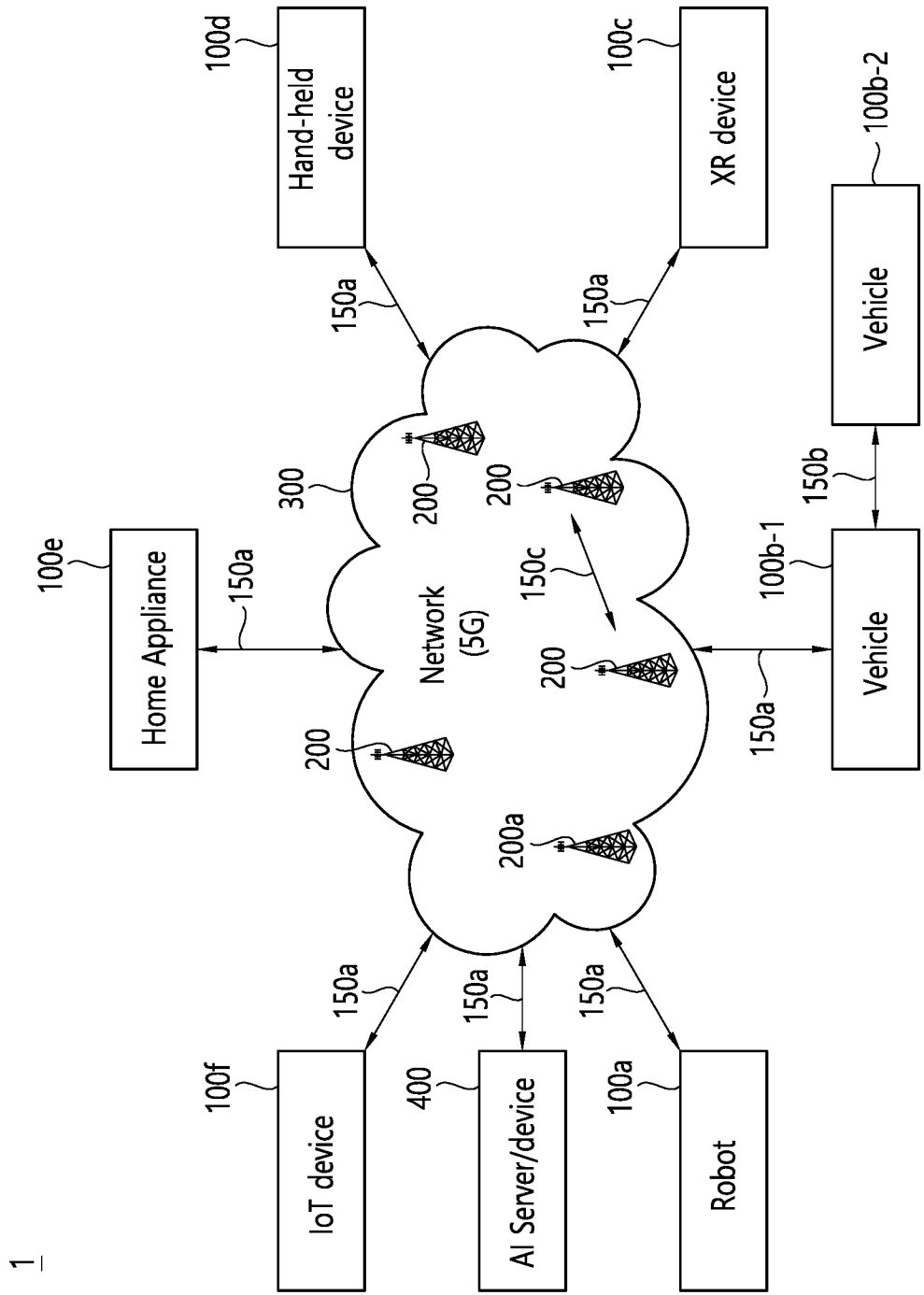
FIG. 20 shows a communication system (1), in accordance with an embodiment of the present disclosure.

FIG. 20 shows a communication system (1), in accordance with an embodiment of the present disclosure.

Referring to FIG. 20, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100o).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Hereinafter, an example of a wireless device to which the present disclosure is applied will be described.

Figure 21:
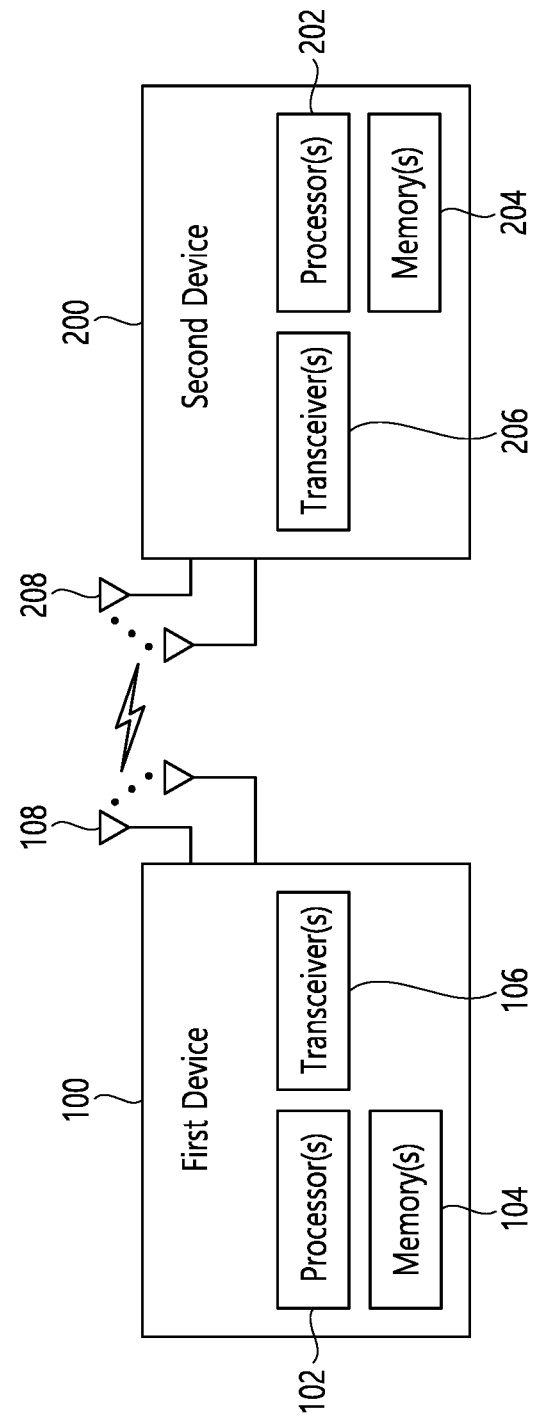
FIG. 21 shows wireless devices, in accordance with an embodiment of the present disclosure.

FIG. 21 shows wireless devices, in accordance with an embodiment of the present disclosure.

Referring to FIG. 21, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 20.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Hereinafter, an example of a signal processing circuit to which the present disclosure is applied will be described.

Figure 22:
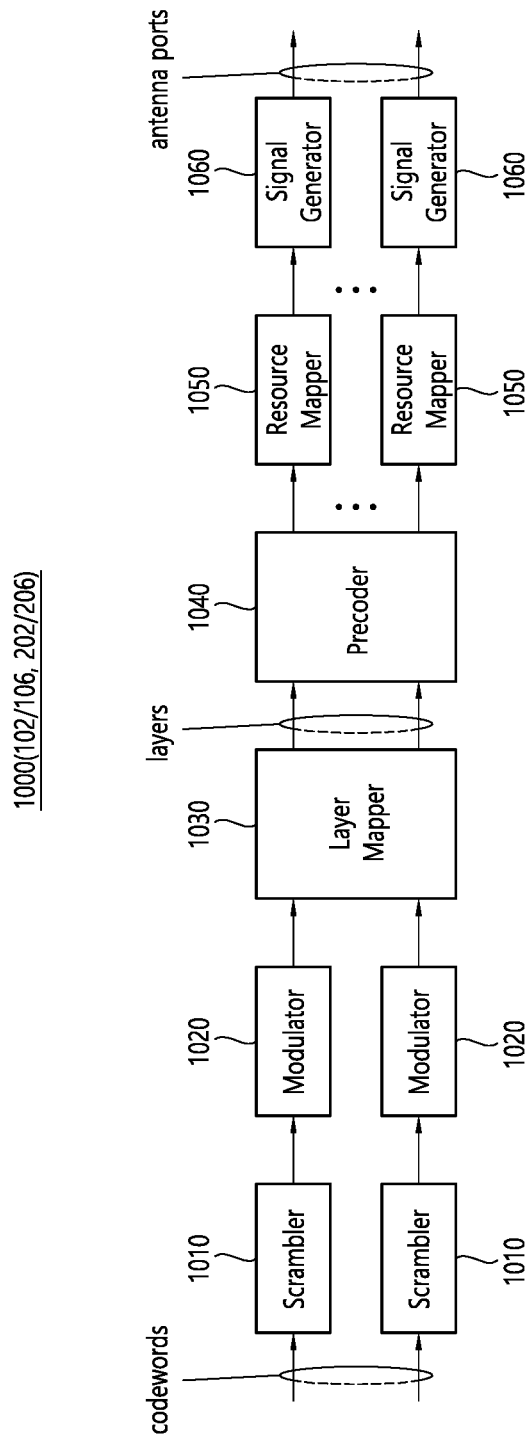
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit (1000) may include scramblers (1010), modulators (1020), a layer mapper (1030), a precoder (1040), resource mappers (1050), and signal generators (1060). An operation/function of FIG. 22 may be performed, without being limited to, the processors (102, 202) and/or the transceivers (106, 206) of FIG. 21. Hardware elements of FIG. 22 may be implemented by the processors (102, 202) and/or the transceivers (106, 206) of FIG. 21. For example, blocks 1010~1060 may be implemented by the processors (102, 202) of FIG. 21. Alternatively, the blocks 1010~1050 may be implemented by the processors (102, 202) of FIG. 21 and the block 1060 may be implemented by the transceivers (106, 206) of FIG. 21.

Codewords may be converted into radio signals via the signal processing circuit (1000) of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 22. For example, the wireless devices (e.g., 100, 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present disclosure is applied will be described.

Figure 23:
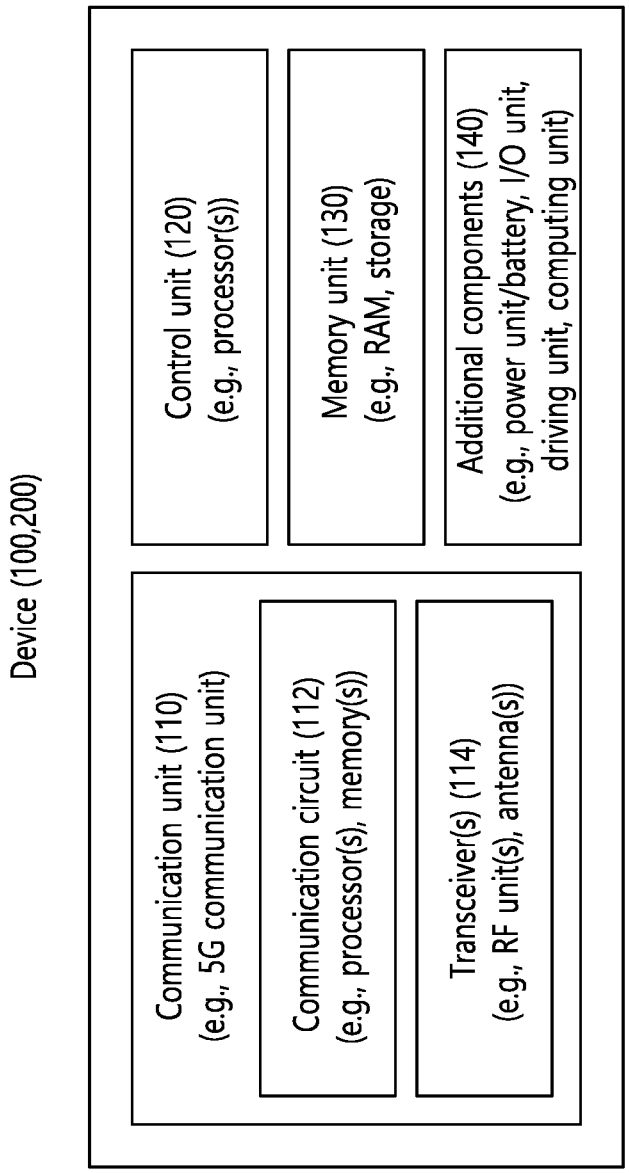
FIG. 23 shows another example of a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 20).

Referring to FIG. 23, wireless devices (100, 200) may correspond to the wireless devices (100, 200) of FIG. 21 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 21. For example, the transceiver(s) (114) may include the one or more transceivers (106, 206) and/or the one or more antennas (108, 208) of FIG. 21. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 20), the vehicles (100*b*-1, 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, and so on. The wireless device may be used in a mobile or fixed place according to a use—example/service.

In FIG. 23, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Hereinafter, an example of a mobile device to which the present disclosure is applied will be described.

Figure 24:
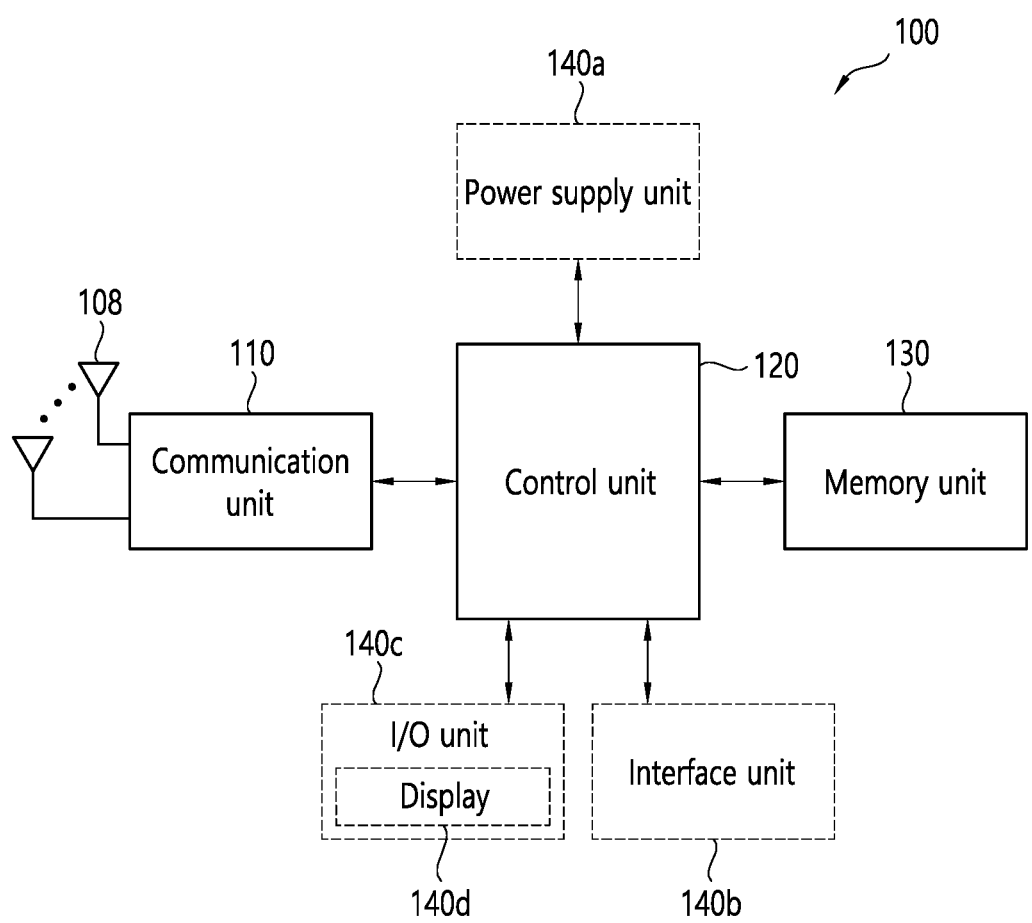
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 23, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, and so on. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Hereinafter, an example of a vehicle or an autonomous driving vehicle to which the present disclosure is applied will be described.

Figure 25:
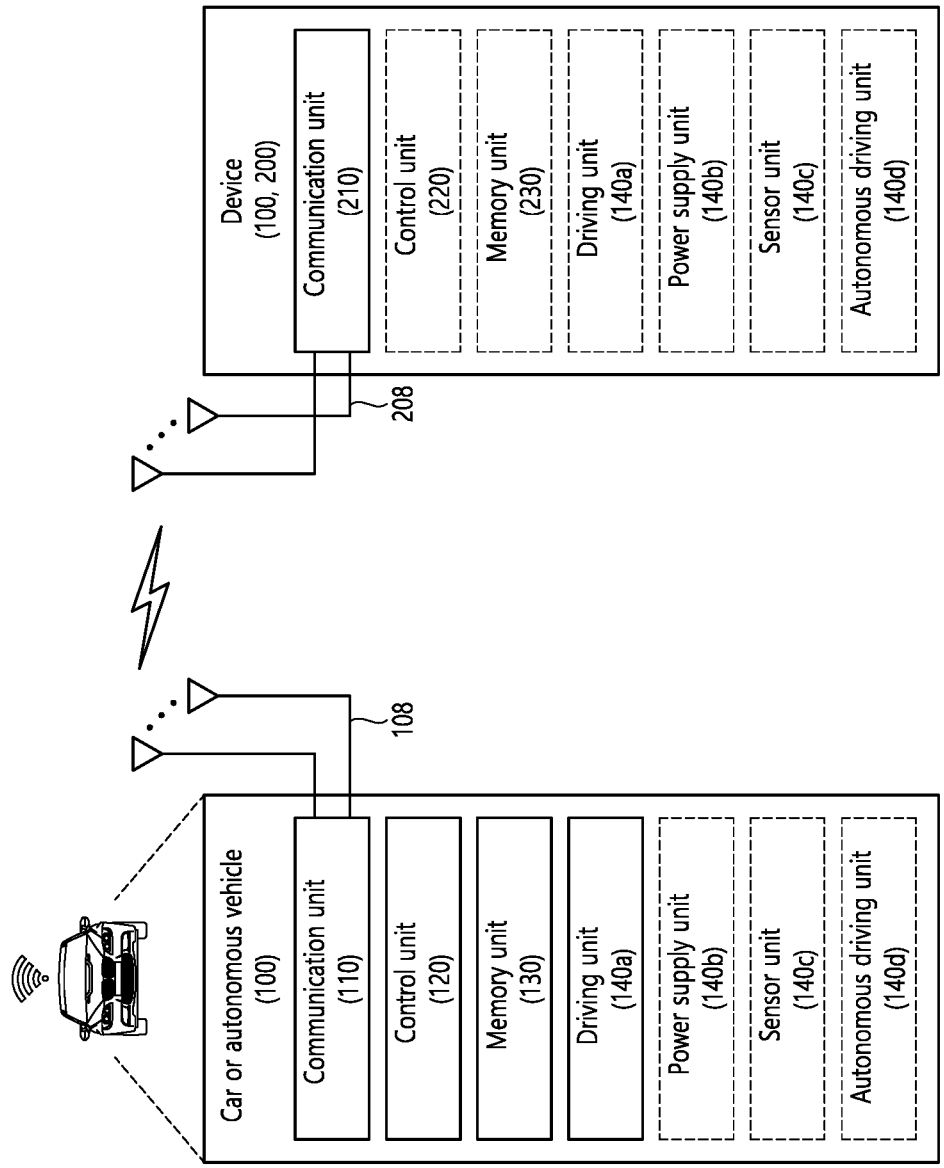
FIG. 25 shows a vehicle or an autonomous vehicle, in accordance with an embodiment of the present disclosure.

FIG. 25 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 25, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 23, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Hereinafter, AR/VR and vehicle examples to which the present disclosure is applied will be described.

Figure 26:
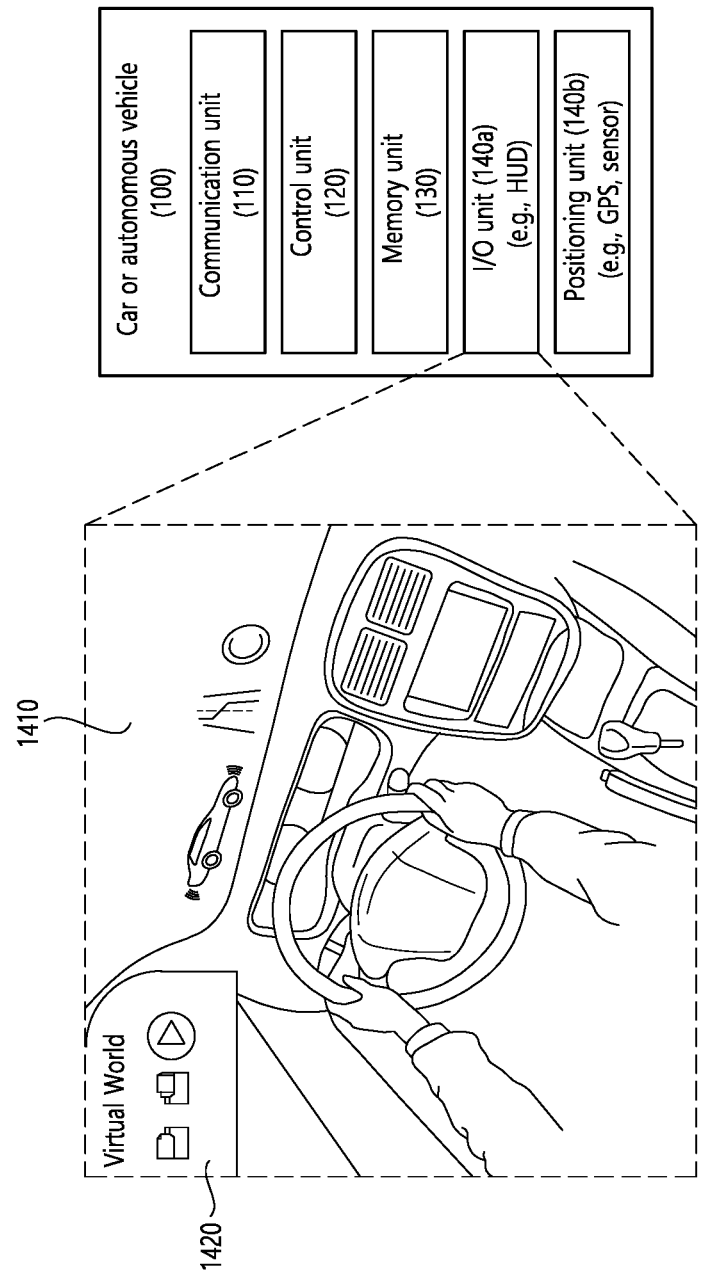
FIG. 26 shows a vehicle, in accordance with an embodiment of the present disclosure.

FIG. 26 shows a vehicle, in accordance with an embodiment of the present disclosure. The vehicle may be implemented as a transport means, an aerial vehicle, a ship, and so on.

Referring to FIG. 26, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 23.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Hereinafter, an example of an XR device to which the present disclosure is applied will be described.

Figure 27:
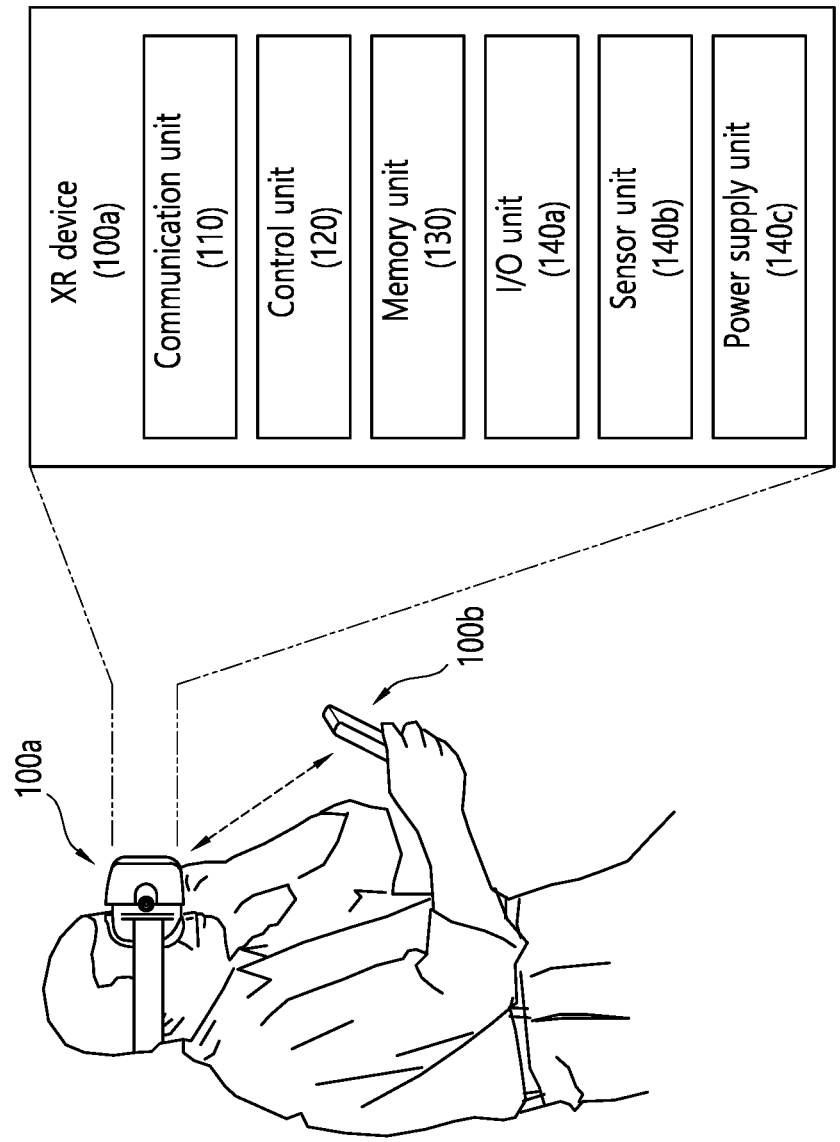
FIG. 27 shows an XR device, in accordance with an embodiment of the present disclosure.

FIG. 27 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 27, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 23, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Hereinafter, an example of a robot to which the present disclosure is applied will be described.

Figure 28:
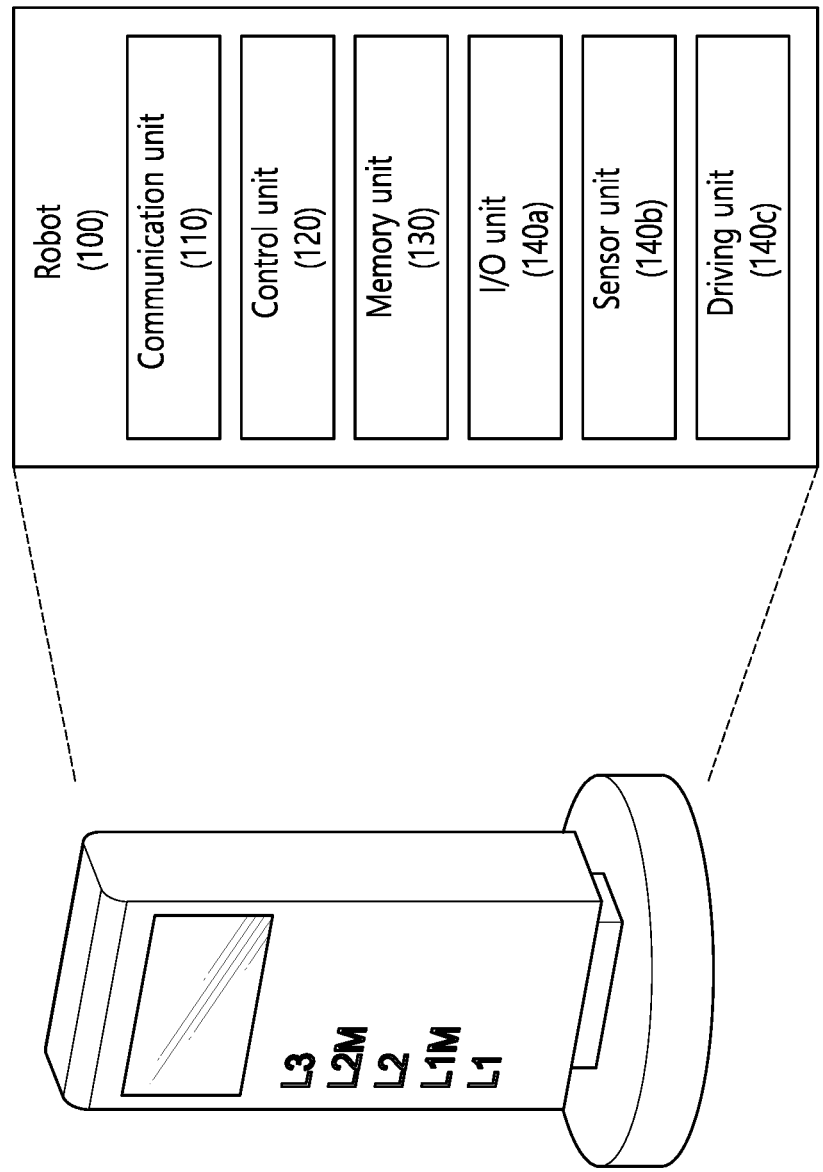
FIG. 28 shows a robot, in accordance with an embodiment of the present disclosure.

FIG. 28 shows a robot, in accordance with an embodiment of the present disclosure. The robot may be categorized into an industrial robot, a medical robot, a household robot, a military robot, and so on, according to a used purpose or field.

Referring to FIG. 28, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 23, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Hereinafter, an AI device to which the present disclosure is applied will be described.

Figure 29:
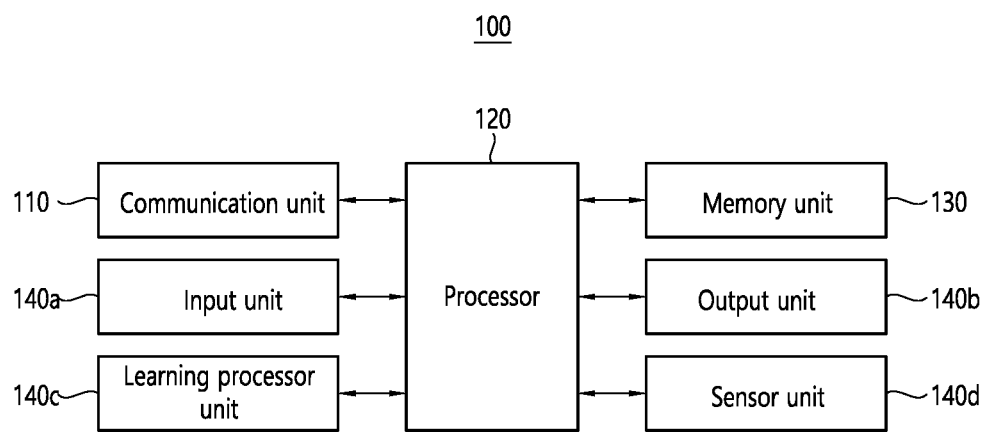
FIG. 29 shows an AI device, in accordance with an embodiment of the present disclosure.

FIG. 29 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 29, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 23, respectively.

The communication unit (110) may transmit and receive wired/radio signals (e.g., sensor information, user input, learning models, or control signals) to and from external devices such as other AI devices (e.g., 100x, 200, 400 of FIG. 20) or an AI server (e.g., 400 of FIG. 20) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 20). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 21). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. An operating method of a road side unit (RSU) in a wireless communication system, the method comprising:
sensing an abnormal vehicle which is abnormally operated, based on operation information including an average operation trajectory;
generating abnormal vehicle information including at least one of information related to the abnormal vehicle or information related to a relationship between the abnormal vehicle and a surrounding vehicle; and
transmitting the abnormal vehicle information via a signal to the surrounding vehicle of the abnormal vehicle,
wherein the average operation trajectory is obtained based on operation trajectories of one or more normal vehicles but excluding operation trajectories of one or more abnormal vehicles for a particular region and time interval,
wherein the abnormal vehicle is sensed based on having an operation trajectory that differs compared to the average operation trajectory by greater than an operation trajectory threshold,
wherein, based on a remaining time for a collision being less than a first time threshold, information for changing operation mode to an autonomous driving mode is transmitted to the abnormal vehicle,
wherein based on sensing the abnormal vehicle and the remaining time for the collision being greater than or equal to the first time threshold, information for changing operation mode to a tele-operated driving mode is transmitted to the abnormal vehicle and a network, and
wherein based on sensing the abnormal vehicle and the remaining time for the collision being greater than the first time threshold and a path difference between the abnormal vehicle and the surrounding vehicle being less than a path threshold, information for changing operation mode to an escort driving mode is transmitted to the abnormal vehicle and the surrounding vehicle.

2. The method of claim 1, wherein the operation information includes an acceleration threshold and a deceleration threshold.

3. The method of claim 2, wherein the abnormal vehicle is sensed based on having an acceleration greater than the acceleration threshold or a deceleration greater than the deceleration threshold.

4. The method of claim 1, wherein the surrounding vehicle transmits abnormal vehicle discovery information to the RSU.

5. The method of claim 4, wherein the abnormal vehicle discovery information includes at least one of a speed of the abnormal vehicle, an acceleration of the abnormal vehicle, and an operation direction of the abnormal vehicle.

6. The method of claim 4, wherein the RSU senses the abnormal vehicle based on the abnormal vehicle discovery information and the operation information.

7. The method of claim 1, wherein the abnormal vehicle information indicates a risk zone related to the abnormal vehicle.

8. The method of claim 7, wherein the risk zone is determined based on a left separation distance, a right separation distance, a front separation distance, and a rear separation distance based on the abnormal vehicle.

9. The method of claim 1, wherein the abnormal vehicle information includes an identifier (ID) of the abnormal vehicle.

10. The method of claim 1, wherein a distance between the surrounding vehicle and the abnormal vehicle is a distance offset or less.

11. The method of claim 1, wherein the RSU includes a base station.

12. A road side unit (RSU) comprising:
at least one transceiver;
at least one processor; and
at least one memory connected to the at least one processor and storing instructions that, based on being executed, cause the RSU to perform operations comprising:
sensing an abnormal vehicle which is abnormally operated, based on operation information including an average operation trajectory, generating abnormal vehicle information including at least one of information related to the abnormal vehicle or information related to a relationship between the abnormal vehicle and a surrounding vehicle, and transmitting the abnormal vehicle information via a signal to the surrounding vehicle of the abnormal vehicle, wherein the abnormal vehicle information includes at least one of information related to the abnormal vehicle and information related to a relationship between the abnormal vehicle and the surrounding vehicle, wherein the average operation trajectory is obtained based on operation trajectories of one or more normal vehicles but excluding operation trajectories of one or more abnormal vehicles for a particular region and time interval, wherein the abnormal vehicle is sensed based on having an operation trajectory that differs compared to the average operation trajectory by greater than an operation trajectory threshold, wherein, based on a remaining time for a collision being less than a first time threshold, information for changing operation mode to an autonomous driving mode is transmitted to the abnormal vehicle, wherein based on sensing the abnormal vehicle and the remaining time for the collision being greater than or equal to the first time threshold, information for changing operation mode to a tele-operated driving mode is transmitted to the abnormal vehicle and a network, and wherein based on sensing the abnormal vehicle and the remaining time for the collision being greater than the first time threshold and a path difference between the abnormal vehicle and the surrounding vehicle being less than a path threshold, information for changing operation mode to an escort driving mode is transmitted to the abnormal vehicle and the surrounding vehicle.

13. The RSU of claim 12, wherein the RSU communicates with at least one of a mobile terminal, the network, and an autonomous driving vehicle other than the RSU.

14. An apparatus adapted to control a road side unit (RSU), the apparatus comprising:
at least one processor; and
at least one memory connected to the at least one processor and storing instructions that, based on being executed, cause the RSU to perform operations comprising:
sensing an abnormal vehicle which is abnormally operated, based on operation information including an average operation trajectory,
generating abnormal vehicle information including at least one of information related to the abnormal vehicle or information related to a relationship between the abnormal vehicle and a surrounding vehicle, and
transmitting the abnormal vehicle information via a signal to the surrounding vehicle of the abnormal vehicle,
wherein the average operation trajectory is obtained based on operation trajectories of one or more normal vehicles but excluding operation trajectories of one or more abnormal vehicles for a particular region and time interval,
wherein the abnormal vehicle is sensed based on having an operation trajectory that differs compared to the average operation trajectory by greater than an operation trajectory threshold,
wherein, based on a remaining time for a collision being less than a first time threshold, information for changing operation mode to an autonomous driving mode is transmitted to the abnormal vehicle,
wherein based on sensing the abnormal vehicle and the remaining time for the collision being greater than or equal to the first time threshold, information for changing operation mode to a tele-operated driving mode is transmitted to the abnormal vehicle and a network, and
wherein based on sensing the abnormal vehicle and the remaining time for the collision being greater than the first time threshold and a path difference between the abnormal vehicle and the surrounding vehicle being less than a path threshold, information for changing operation mode to an escort driving mode is transmitted to the abnormal vehicle and the surrounding vehicle.

* * * * *